United States Patent
Song et al.

(10) Patent No.: US 9,609,375 B2
(45) Date of Patent: *Mar. 28, 2017

(54) METHOD FOR MAPPING BETWEEN SIGNALING INFORMATION AND ANNOUNCEMENT INFORMATION AND BROADCAST RECEIVER

(71) Applicant: LG ELECTRONICS INC., Seoul (KR)

(72) Inventors: Jae Hyung Song, Seoul (KR); Jong Yeul Suh, Seoul (KR); Chul Soo Lee, Seoul (KR); Gomer Thomas, Arlington, WA (US); Jin Pil Kim, Seoul (KR); Ho Taek Hong, Seoul (KR); Joon Hui Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,052

(22) Filed: Jan. 28, 2016

(65) Prior Publication Data

US 2016/0150261 A1  May 26, 2016

Related U.S. Application Data

(63) Continuation of application No. 14/563,900, filed on Dec. 8, 2014, now Pat. No. 9,282,349, which is a
(Continued)

(30) Foreign Application Priority Data

Jun. 9, 2009 (KR) ........................ 10-2009-0051208

(51) Int. Cl.
*H04N 7/18* (2006.01)
*H04N 21/262* (2011.01)
(Continued)

(52) U.S. Cl.
CPC ....... *H04N 21/26283* (2013.01); *H04N 7/163* (2013.01); *H04N 21/2353* (2013.01);
(Continued)

(58) Field of Classification Search
CPC ....... H04N 21/26283; H04N 21/64322; H04N 21/6125; H04N 21/2353; H04N 21/4345;
(Continued)

(56) References Cited

U.S. PATENT DOCUMENTS 7,305,696 B2    12/2007  Thomas et al.
2003/0018971 A1*  1/2003  McKenna, Jr. ...... H04N 21/462
                                                         725/40
(Continued)

FOREIGN PATENT DOCUMENTS

KR    1020070031459    3/2007
KR    10-2007-0122026  12/2007
(Continued)

OTHER PUBLICATIONS

Korean Intellectual Property Office Application No. 10-2016-0019513, Notice of Allowance dated Aug. 22, 2016, 3 pages.

*Primary Examiner* — Oschta Montoya
(74) *Attorney, Agent, or Firm* — Lee, Hong, Degerman, Kang & Waimey

(57) ABSTRACT

A method for mapping signaling information to announcement information and a broadcast receiver are disclosed herein. A method of providing a Non-Real-Time (NRT) service, the method comprises extracting identification information of first signaling information and second signaling information based upon a program specific information/program and system information protocol (PSI/PSIP) table, receiving the first signaling information and second signaling information based upon the extracted identification information, constructing and displaying a service guide
(Continued)

using the received first signaling information, acquiring first content identification information as a content selected from the displayed service guide, accessing a File Delivery over Unidirectional Transport (FLUTE) session using the received second signaling information, acquiring second content identification information matched with the acquired first content identification information from the accessed FLUTE session and receiving and storing one or more file constructing corresponding content based upon the acquired second content identification information.

2 Claims, 21 Drawing Sheets

Related U.S. Application Data continuation of application No. 14/034,415, filed on Sep. 23, 2013, now Pat. No. 8,966,554, which is a continuation of application No. 13/679,955, filed on Nov. 16, 2012, now Pat. No. 8,572,658, which is a continuation of application No. 12/481,569, filed on Jun. 9, 2009, now Pat. No. 8,365,229.

(60) Provisional application No. 61/059,811, filed on Jun. 9, 2008, provisional application No. 61/079,121, filed on Jul. 8, 2008, provisional application No. 61/115,888, filed on Nov. 18, 2008, provisional application No. 61/121,178, filed on Dec. 9, 2008, provisional application No. 61/138,494, filed on Dec. 17, 2008, provisional application No. 61/153,973, filed on Feb. 20, 2009, provisional application No. 61/153,985, filed on Feb. 20, 2009, provisional application No. 61/169,711, filed on Apr. 15, 2009, provisional application No. 61/179,005, filed on May 17, 2009.

(51) Int. Cl.
| | |
|---|---|
| *H04N 7/16* | (2011.01) |
| *H04N 21/434* | (2011.01) |
| *H04N 21/462* | (2011.01) |
| *H04N 21/482* | (2011.01) |
| *H04N 21/40* | (2011.01) |
| *H04N 21/472* | (2011.01) |
| *H04N 21/235* | (2011.01) |
| *H04N 21/2665* | (2011.01) |
| *H04N 21/431* | (2011.01) |
| *H04N 21/61* | (2011.01) |
| *H04N 21/643* | (2011.01) |
| *H04H 20/16* | (2008.01) |

(52) U.S. Cl.
CPC ......... *H04N 21/2665* (2013.01); *H04N 21/40* (2013.01); *H04N 21/431* (2013.01); *H04N 21/4345* (2013.01); *H04N 21/4622* (2013.01); *H04N 21/47202* (2013.01); *H04N 21/482* (2013.01); *H04N 21/4828* (2013.01); *H04N 21/6125* (2013.01); *H04N 21/64322* (2013.01); *H04H 20/16* (2013.01); *H04H 2201/40* (2013.01)

(58) Field of Classification Search
CPC ............. H04N 21/431; H04N 21/4828; H04N 21/4622; H04N 21/2665; H04N 21/482; H04N 21/40; H04N 21/47202; H04N 7/163; H04H 20/16; H04H 2201/40
See application file for complete search history.

(56) References Cited

U.S. PATENT DOCUMENTS

| | | |
|---|---|---|
| 2003/0196204 A1 | 10/2003 | Thiagarajan et al. |
| 2004/0160943 A1 | 8/2004 | Cain |
| 2004/0163110 A1 | 8/2004 | Won |
| 2006/0059267 A1 | 3/2006 | Cugi et al. |
| 2006/0225093 A1* | 10/2006 | Huttunen ............ H04N 21/235 725/39 |
| 2010/0095328 A1 | 4/2010 | Hartung et al. |
| 2010/0309387 A1 | 12/2010 | Eyer |
| 2011/0001885 A1 | 1/2011 | Eyer |
| 2011/0004907 A1 | 1/2011 | Ryer |
| 2011/0004908 A1 | 1/2011 | Eyer |
| 2011/0004910 A1 | 1/2011 | Eyer |

FOREIGN PATENT DOCUMENTS

| | | |
|---|---|---|
| KR | 10-2008-0005063 | 1/2008 |
| KR | 1020080032663 | 4/2008 |

\* cited by examiner

FIG. 5

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

FIG. 6

| Value | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional data) conforming to ATSC standards |
| 0x03 | ATSC_audio - The virtual channel carries audio programming (audio service and optional data) conforming to ATSC standards |
| 0x04 | ATSC_data_only_service - The virtual channel carries a data service conforming to ATSC standards, but no video of stream_type 0x02 or audio of stream_type 0x81 |
| 0x05 | Software Download Data Service – see A/97 |
| 0x06 | Unassociated/small screen service – see A/65C Amendment 1 |
| 0x07 | Parameterized Service – New A/V CODEC |
| 0x08 | ATSC_nrt_service — The virtual channel carries a NRT service conforming to ATSC standards |
| 0x09-0x7F | [ Reserved for future ] |
| 0x80-0xFF | [ User Private ] |

FIG. 7

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for(i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG. 8

| Syntax | No. of Bits | Format |
|---|---|---|
| data_service_table_bytes() { | | |
|     sdf_protocol_version | 8 | uimsbf |
|     application_count_in_section | 8 | uimsbf |
|     if(application_count_in_section > 0) { | | |
|         for(j = 0; j <application_count_in_section; j++) { | | |
|             compatibility_descriptor() | | |
|             app_id_byte_length | 16 | uimsbf |
|             if(app_id_byte_length > 1) { | | |
|                 app_id_description | 16 | uimsbf |
|                 for(i=0;i<app_id_byte_length-2;i++) { | | |
|                     app_id_byte | 8 | bslbf |
|                 } | | |
|             } | | |
|             tap_count | 8 | uimsbf |
|             for(i=0;i<tap_count; i++) { | | |
|                 protocol_encapsulation | 8 | uimsbf |
|                 action_type | 7 | uimsbf |
|                 resource_location | 1 | bslbf |
|                 Tap() | | |
|                 tap_info_length | 16 | uimsbf |
|                 for(k=0; k<N; k++) { | | |
|                     descriptor() | | |
|                 } | | |
|             } | | |
|             app_info_length | 16 | uimsbf |
|             for(i=0; i<M; i++) { | | |
|                 descriptor() | | |
|             } | | |
|             app_data_length | 16 | uimsbf |
|             for(i=0; i<app_data_length; i++) { | | |
|                 app_data_byte | 8 | bslbf |
|             } | | |
|         } | | |
|     } | | |
|     service_info_length | 16 | uimsbf |
|     for(j=0; j<K; j++) { | | |
|         descriptor() | | |
|     } | | |
|     service_private_data_length | 16 | uimsbf |
|     for(j=0; j<service_private_data_length; j++){ | | |
|         service_private_data_byte | 8 | bslbf |
|     } | | |
| } | | |

FIG. 11

| Syntax | No.of Bits | Format |
|---|---|---|
| NRT_service_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_MH_protocol_version | 8 | uimsbf |
|         ensemble_id | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_MH_services | 8 | uimsbf |
|     for (j=0;j< num_MH_services; j++) | | |
|     { | | |
|         MH_service_id | 16 | uimsbf |
|         multi_ensemble_service | 2 | uimsbf |
|         MH_service_status | 2 | uimsbf |
|         SP_indicator | 1 | bslbf |
|         short_MH_service_name_length /' m '/ | 3 | uimsbf |
|         short_MH_service_name | 16*m | |
|         reserved | 2 | '11' |
|         MH_service_category | 6 | uimsbf |
|         num_components | 5 | uimsbf |
|         IP_version_flag | 1 | bslbf |
|         source_IP_address_flag | 1 | bslbf |
|         MH_service_destination_IP_address_flag | 1 | bslbf |
|         if (source_IP_address_flag) | | |
|             source_IP_address | 32 or 128 | uimsbf |
|         if (MH_service_destination_IP_address_flag) | | |
|             MH_service_destination_IP_address | 32 or 128 | uimsbf |
|         for (j=0;j< num_components; j++) | | |
|         { | | |
|             reserved | 1 | '1' |
|             essential_component_indicator | 1 | bslbf |
|             component_destination_IP_address_flag | 1 | bslbf |
|             port_num_count | 5 | uimsbf |
|             component_destination_UDP_port_num | 16 | uimsbf |
|             if (component_destination_IP_address_flag) | | |
|                 component_destination_IP_address | 32 or 128 | uimsbf |
|             reserved | 4 | '1111' |

FIG. 12

| | | |
|---|---|---|
| num_component_level_descriptors | 4 | uimsbf |
| for (k=0;k< num_components_level_descriptors; k++) | | |
| { | | |
|     component_level_descriptor() | var | |
| } | | |
| } | | |
| reserved | 4 | '1111' |
| num_MH_service_level_descriptors | 4 | uimsbf |
| for (m=0; m<num_MH_service_level_descriptors; m++) | | |
| { | | |
|     MH_service_level_descriptor() | var | |
| } | | |
| } | | |
| reserved | 4 | '1111' |
| num_ensemble_level_descriptors | 4 | uimsbf |
| for (n=0; n<num_ensemble_level_descriptors; n++) { | | |
| { | | |
|     ensemble_level_descriptor() | var | |
| } | | |
| } | | |

FIG. 13

| Syntax | No.of Bits | Format |
|---|---|---|
| MH_component_descriptor() { | | |
|     descriptor_tag | 8 | 0 x CB |
|     descriptor_length | 8 | uimsbf |
|     component_type | 7 | uimsbf |
|     component_encryption_flag | 1 | |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     MH_component_data(component_type) | var | |
| } | | |

FIG. 14

| Syntax | No.of Bits | Format |
|---|---|---|
| NRT_component_data() { | | |
|    TSI | 16 | uimsbf |
|    session_start_time | 32 | uimsbf |
|    session_end_time | 32 | uimsbf |
|    reserved | 5 | '11111' |
|    tias_bandwidth_indicator | 1 | bslbf |
|    as_bandwidth_indicator | 1 | bslbf |
|    FEC_OTI_indicator | 1 | bslbf |
|    if(tias_bandwidth_indicator == '1') { | | |
|       tias_bandwidth | 16 | uimsbf |
|    } | | |
|    if(as_bandwidth_indicator == '1') { | | |
|       as_bandwidth | 16 | uimsbf |
|    } | | |
|    if(FEC_OTI_indicator == '1') { | | |
|      FEC_encoding_id | 8 | uimsbf |
|      FEC_instance_id | 16 | uimsbf |
|    } | | |
| } | | |

FIG. 15

| Syntax | No. of Bits | Format |
|---|---|---|
| NRT_content_table_section ( ) { | | |
|     table_id | 8 | uimsbf |
|     section_syntax_indicator | 1 | '1' |
|     private_indicator | 1 | '1' |
|     reserved | 2 | bslbf |
|     section_length | 12 | uimsbf |
|     NRT_Service_ID | 16 | uimsbf |
|     reserved | 2 | bslbf |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_contents_in_section | 8 | uimsbf |
|     for (j=0; j < num_contents_in_section; j++) { | | |
|         content_version | 32 | uimsbf |
|         content_id | 16 | uimsbf |
|         content_available_start_time | 32 | uimsbf |
|         content_available_end_time | 32 | uimsbf |
|         ETM_location | 2 | uimsbf |
|         content_length_in_seconds | 30 | uimsbf |
|         content_size | 48 | uimsbf |
|         content_delivery_bit_rate | 32 | uimsbf |
|         content_title_length | 8 | uimsbf |
|         content_title_text ( ) | var | |
|         descriptors_length | 16 | uimsbf |
|         for (i=0; i < N; i++) { | | |
|             descriptor ( ) | | |
|         } | | uimsbf |
|     } | | |
| } | | |

FIG. 18

| Syntax | No. of Bits | Format |
|---|---|---|
| NRT_Content_delivery_channel_details_descriptor() { | | |
|    descriptor_tag | 8 | 0xTBD |
|    descriptor_length | 8 | uimsbf |
|    storage_reservation | 32 | uimsbf |
|    updated | 32 | uimsbf |
|    content_types_length | 8 | uimsbf |
|    content_types_text() | var | |
|    mime_types_length | 8 | uimsbf |
|    mime_types_text() | var | |
|    charging_rules_length | 8 | uimsbf |
|    charging_rules_text() | var | |
|    num_purchase_options | 8 | uimsbf |
|    for (i=0; i<num_purchase_options; i++) | | |
|    { | | |
|       purchase_option_id_length | 8 | uimsbf |
|       purchase_option_id_text() | var | |
|       reserved | 6 | '111111' |
|          cost_information_flag | 1 | bslbf |
|          price_information_flag | 1 | bslbf |
|          if (cost_information_flag == '1') | | |
|          { | | |
|             cost_inforamtion_length | 8 | uimsbf |
|             cost_inforamtion_text() | var | |
|          } | | |
|          if (price_information_flag == '1') | | |
|          { | | |
|             amount | 32 | uimsbf |
|             currency | 16 | uimsbf |
|          } | | |
|    } | | |
| } | | |

FIG. 19

```
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs="unbounded"/>
      <xs:element name="FDT-Content-ID" type="xs:unsignedShort" minOccurs="0" maxOccurs="unbounded"/>   ①
        <xs:any namespace="##other" processContents="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
      <xs:element name="File-Content-ID" type="Content-ID-Type" minOccurs="0" maxOccurs="unbounded"/>   ②
        <xs:any namespace="##other" processContents="skip" minOccurs="0" maxOccurs="unbounded"/>
    </xs:sequence>
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="Content-ID-Type">
    <xs:attribute name="Content-ID" type="xs:unsingedShort" use="required"/>
    <xs:attribute name="entry" type="xs:boolean" default="false" use="optional"/>   ③
    <xs:anyAttribute processContents="skip"/>
  </xs:complexType>
</xs:schema>
```

FIG. 20

```
<?xml version="1.0" encoding="UTF-8"?>
<xs:schema xmlns="urn:atsc:nrt:flute:fdt:2009" xmlns:xs=" http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs="unbounded"/>
      <xs:element name="FDT-Content-ID" type="FDT-Content-ID-Type" minOccurs="0" maxOccurs="unbounded"/> ①
      <xs:any namespace="##other" processContents="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
      <xs:element name="File-Content-ID" type="Content-ID-Type" minOccurs="0" maxOccurs="unbounded"/>
      <xs:any namespace="##other" processContents="skip" minOccurs="0" maxOccurs="unbounded"/>
    </xs:sequence>
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="FDT-Content-ID-Type"> ②
    <xs:sequence>
      <xs:element name="Entry-Content-Location" type="xs:anyURI" minOccurs="0" maxOccurs="unbounded"/>
    </xs:sequence>
    <xs:attribute name="Content-ID" type="xs:unsingedShort" use="required"/>
    <xs:anyAttribute processContents="skip"/>
  </xs:complexType>
  <xs:complexType name="Content-ID-Type">
    <xs:attribute name="Content-ID" type="xs:unsingedShort" use="required"/>
    <xs:attribute name="entry" type="xs:boolean" default="false" use="optional"/>
    <xs:anyAttribute processContents="skip"/>
  </xs:complexType>
</xs:schema>
```

METHOD FOR MAPPING BETWEEN SIGNALING INFORMATION AND ANNOUNCEMENT INFORMATION AND BROADCAST RECEIVER

This application is a continuation of U.S. patent application Ser. No. 14/563,900, filed Dec. 8, 2014, now U.S. Pat. No. 9,282,349, which is a continuation of U.S. patent application Ser. No. 14/034,415, filed Sep. 23, 2013, now U.S. Pat. No. 8,966,554, which is a continuation of U.S. patent application Ser. No. 13/679,955, filed Nov. 16, 2012, now U.S. Pat. No. 8,572,658, which is a continuation of U.S. patent application Ser. No. 12/481,569, filed Jun. 9, 2009, now U.S. Pat. No. 8,365,229, which claims the benefit of U.S. Provisional Application Nos. 61/059,811, filed on Jun. 9, 2008, 61/079,121, filed on Jul. 8, 2008, 61/115,888, filed on Nov. 18, 2008, 61/121,178, filed on Dec. 9, 2008, 61/138,494, filed on Dec. 17, 2008, 61/153,973, filed on Feb. 20, 2009, 61/153,985, filed on Feb. 20, 2009, 61/169,711, filed on Apr. 15, 2009, and 61/179,005, filed on May 17, 2009, and also claims the benefit of earlier filing date and right of priority to Korean Application No. 10-2009-0051208, filed on Jun. 9, 2009, the contents of all of which are hereby incorporated by reference in their entireties.

BACKGROUND OF THE INVENTION

Field of the Invention

The present invention relates to a signaling method for a service type of a service transmitted by non-real time (hereinafter abbreviated NRT) and detailed information on the service through a terrestrial broadcast network and an operation of an NRT receiver for receiving to process the corresponding information, and more particularly, to a broadcast receiver and a method of mapping signaling information for an NRT service to announcement information therein. Although the present invention is suitable for a wide scope of applications, it is particularly suitable for the receiver to obtain additional information on the corresponding NRT service using the service relevant signaling information, determine how to process and output the corresponding service to a user and determine an operation of an associated application module.

Discussion of the Related Art

Generally, a Non-Real Time (NRT) service is one of powerful applications that will be utilized for future DTV services. The NRT is accompanied by non-real time transmission (not real-time streaming), storage and viewing operations and transmits a content of a file type on a surplus bandwidth via a broadcast medium such as terrestrial and the like. And, it is expected that the NRT will be implemented various kinds of service functions including push VOD, targeted advertising and the like.

SUMMARY OF THE INVENTION

Accordingly, the present invention is directed to a broadcast receiver and a method of mapping signaling information to announcement information therein that substantially obviate one or more problems due to limitations and disadvantages of the related art.

An object of the present invention is to provide a broadcast receiver and a method of mapping signaling information to announcement information, wherein the signaling data for a non-real time (NRT) service can be defined.

Another object of the present invention is to provide a broadcast receiver and a method of mapping signaling information to announcement information, wherein a scheme for transmitting the above-defined signaling data can be defined.

Another object of the present invention is to provide a broadcast receiver and a method of mapping signaling information to announcement information, wherein an NRT service is accessible in a manner that the receiver receives and process signaling data for the transmitted NRT service.

Another object of the present invention is to provide a method of mapping a content identifier of the signaling data to an identifier of a selected and transmitted content in a receiver.

A further object of the present invention is to provide a method of receiving and processing a content selected from a service guide configured by using the signaling data in the receiver, which can provide the processed content to a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of providing a non-real-time (NRT) service may include extracting identification information of first signaling information and second signaling information based upon a program specific information/program and system information protocol (PSI/PSIP) table, receiving the first signaling information and the second signaling information based upon the extracted identification information, constructing and displaying a service guide using the received first signaling information, acquiring first content identification information of a content selected from the displayed service guide, accessing a File Delivery over Unidirectional Transport (FLUTE) session using the received second signaling information, acquiring second content identification information matched with the acquired first content identification information and receiving and storing one or more file constructing corresponding content based upon the acquired second content identification information.

And, the identification information is extracted using at least one of a virtual channel table (VCT), a data service table (DST) and a program map table (PMT) in the PSI/PSIP table.

Also, the one or more file, the first signaling information and the second signaling information is received after a sequentially packetizing of an internet protocol (IP), an addressable section and an MPEG-2 transport stream.

And, the first signaling information is an NRT content table (NCT) and the second signaling information is an NRT service table (NST).

Also, the second content identification information is extracted from a file description table (FDT) in the accessed FLUTE session.

Herein, the method may further include constructing and displaying a service guide using the received first signaling information.

Herein, the method may further include acquiring first service identification information in connection with the acquired first content identification information from the first signaling information associated with the selected content item in the displayed service guide.

Herein, the method may further include extracting second service identification information matched with the acquired first service identification information from the received second signaling information.

In another aspect of the present invention, a broadcasting receiver may include a baseband processor, a first handler, a second handler, a third handler, a controller and a storage unit. Herein, the baseband processor may extract identification information of first signaling information and second signaling information using a program specific information/program and system information protocol (PSI/PSIP) table and receiving the first signaling information and the second signaling information based upon the extracted identification information. A first handler for constructing and displaying a service guide using the received first signaling information. The second handler may acquire a first content identifier from the received first signaling information of a content selected from the displayed service guide. The third handler may access a File Delivery over Unidirectional Transport (FLUTE) session using the received second signaling information and acquiring a second content identifier matched with the acquired first content identifier. The controller may control to receive and store one or more files constructing corresponding content item based upon the acquired second content identifier. And, the storage unit may store the received files.

The controller may control to extract identification information using at least one of a virtual channel table (VCT), a data service table (DST) and a program map table (PMT) in the PSI/PSIP table.

The controller may control to receive the one or more file, the first signaling information and the second signaling information is received after a sequentially packetizing of an IP, an addressable section and an MPEG-2 transport stream.

The controller controls to receive the first signaling information and the second signaling information, and wherein the first signaling information is an NRT content table (NCT) and the second signaling information is an NRT service table (NST).

The controller controls to receive the second content identification information from the extracted a file description table (FDT) in the accessed FLUTE session.

The controller controls to acquire the first service identification information in connection with the acquired with the first content identification information from the first signaling information associated with a content item selected from the displayed service guide.

The controller controls to extract the second identification information matched with the acquired first service identification information from the received second signaling information.

Accordingly, the present invention provides the following effects and/or advantages.

First of all, a transmitting side is able to include signaling data to enable an NRT service, which is provided by a receiver, to be properly recognized, received and processed.

Secondly, the receiver is able to receive, process and provide the NRT service to a user using the transmitted signaling data.

Thirdly, the receiver is able to configure and provide a service guide to a user using the transmitted signaling data.

Fourthly, the receiver is able to receive and process content selected from the above-configured service guide accurately using signaling information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is an exemplary diagram of an ATSC service type according to the present invention;

FIG. 6 is another exemplary diagram of an ATSC service type according to the present invention;

FIG. 7 is a diagram for a bit-stream section of a TVCT section configured according to an embodiment of the present invention;

FIG. 8 is a diagram for a bit-stream syntax of a DST section to identity an NRT application configured according to an embodiment of the present invention;

FIGS. 11 and 12 are a diagram for a bit-stream syntax of NST extracted by a receiver from a received MPEG-2 TS configured according to an embodiment of the present invention;

FIG. 13 is a diagram for a bit-stream syntax of NRT_component_descriptor( ) configured according to an embodiment of the present invention;

FIG. 14 is a diagram for a bit-stream syntax of NRT_component_data_descriptor for FLUTE file delivery configured according to an embodiment of the present invention;

FIG. 15 is a diagram for a bit-stream syntax of an NCT section configured according to an embodiment of the present invention;

FIG. 18 is a diagram for a bit-stream syntax of an NRT content delivery channel details descriptor configured according to an embodiment of the present invention;

FIG. 19 is a diagram to explain a FDT schema for mapping a file to content_id according to an embodiment of the present invention;

FIG. 20 is a diagram to explain a FDT schema for mapping a file to content_id according to another embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Definitions of Terminologies Used for the Invention

Terminologies used for the present invention are selected from general terminologies, which are currently and widely used, in consideration of functions in the present invention but may vary according to intentions of a person having an ordinary knowledge in the technical field, practices or the advent of new technology, etc. In specific case, a terminology may be arbitrarily chosen by the applicant(s). In this case, its detailed meaning shall be described in Detailed Description of Invention. Therefore, the terminology used for the present invention needs to be defined based on the intrinsic meaning of the terminology and the contents across the present invention instead of a simple name of the terminology.

A Conceptional Diagram of a Non-Real Time (NRT) Service

Figure 1:
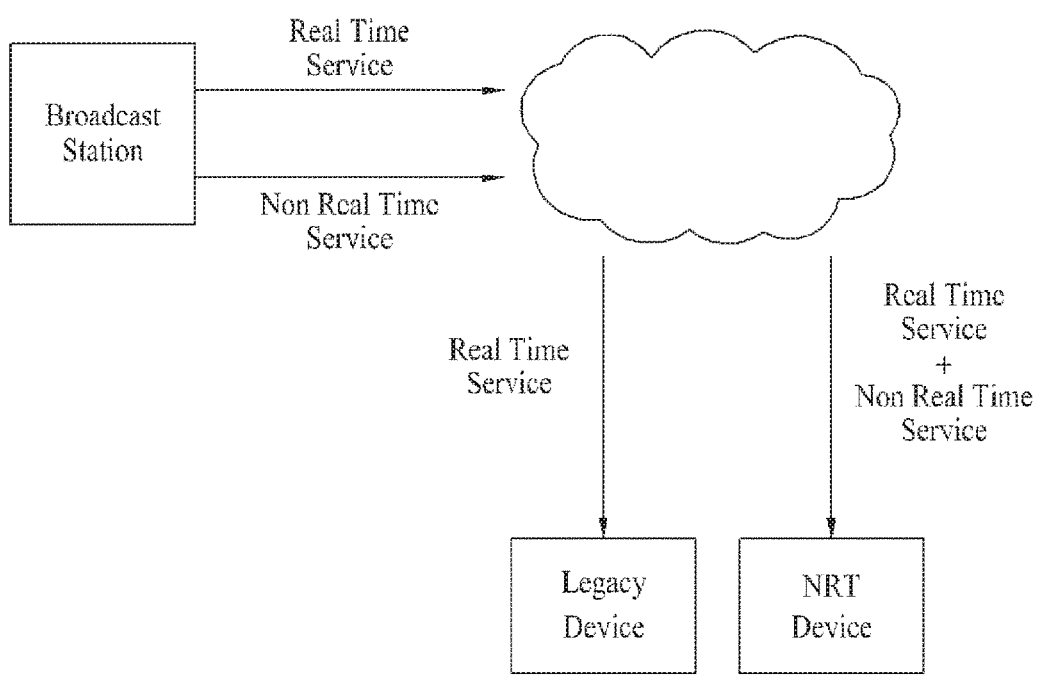
FIG. 1 is an exemplary conceptional diagram of an NRT service.

FIG. 1 is an exemplary conceptional diagram for the NRT service.

First of all, a broadcasting station transmits an RT (real-time) service according to a conventional method. In doing so, the broadcasting station transmits the RT service or the NRT service using a bandwidth left in the due course. In this case, the NRT service can contain a news clip, weather information, advertisements, contents for Push video on demand (VOD) and the like.

Yet, a related art DTV receiver, i.e., a legacy device has the principle that the operation is not affected by an NRT stream included within a channel. However, the related art DTV receiver has a problem in receiving and processing the NRT service provided by a broadcasting station properly because of not having a means for processing unit for the NRT service.

On the contrary, a broadcast receiver according to the present invention, i.e., an NRT device is able to properly receive and process an NRT service combined with an RT service, thereby providing a viewer with more various functions than those of the related art DTV.

In this case, the RT service and the NRT service are transmitted on the same DTV channel or different DTV channels and are transmitted through an MPEG-2 transport packet (TP) or an internet protocol (IP) datagram. Hence, a receiver needs to identify the two kinds of services transmitted on the same or different channel. For this, this specification discloses a method of defining and providing signaling information to enable a receiver to receive and process an NRT service properly. In this case, a broadcasting station provides signaling information. Specifically, at least one unique packet identifier (PID) for identifying an NRT service can be allocated.

A Receiving System

Figure 2:
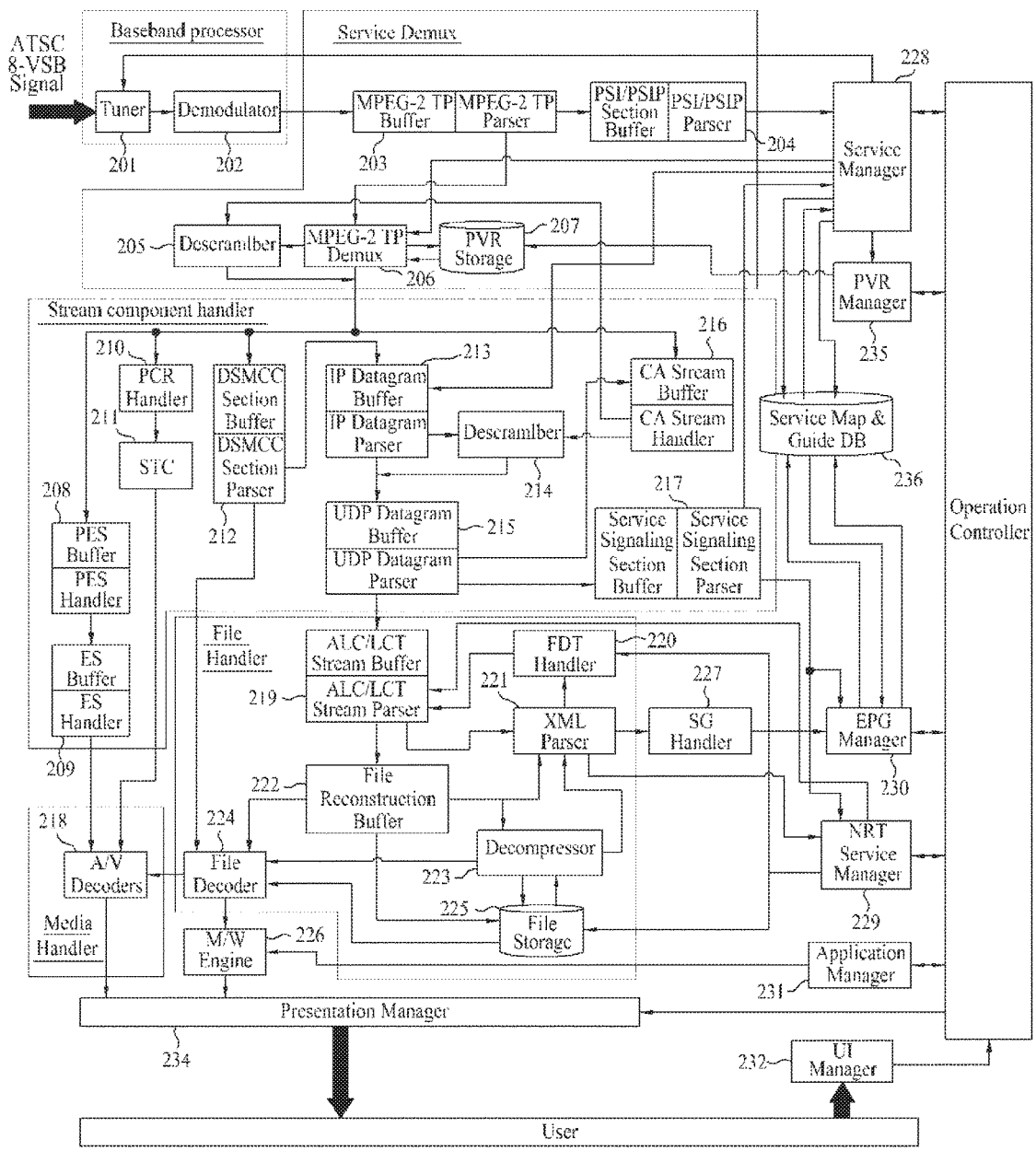
FIG. 2 is a block diagram of a receiving system according to an embodiment of the present invention.

FIG. 2 is a block diagram of a receiving system according to an embodiment of the present invention.

Referring to FIG. 2, the receiving system mainly includes a part of a baseband processor, a part of an MPEG-2 service demultiplexer (demux), a part of a stream component handler, a part of a media handler, a part of a file handler and other parts. The units of the receiving system shown in FIG. 2 are explained as follows.

First of all, the part of the baseband processor includes a tuner 201 and a vestigial side band (VSB) demodulator 202. The tuner 201 detects VSB radio frequency (RF) signal transmitted over the air and then extracts a symbol from the detected VSB RF signal. In this case, the tuner 201 is controlled by a service manager 228. The VSB demodulator 202 reconstructs meaningful data by demodulating the VSB symbol extracted by the tuner 201.

The part of the MPEG-2 service demultiplexer includes an MPEG-2 TP buffer/parser 203, a program specific information/program and system information protocol (PSI/PSIP) section/buffer 204, a descrambler 205, an MPEG-2 TP demultiplexer (demux) 206 and a personal video recorder (PVR) storage 207.

The MPEG-2 TP buffer/parser 203 buffers and reconstructs an MPEG-2 TP carried on a VSB signal and then detects and processes a TP header.

The PSI/PSIP section/buffer 204 buffers and parses PSI/PSIP section data carried on an MPEG-2 TS. In this case, the parsed PSI/PSIP data is collected by the service manager 228 and is then stored as a service map and guide data in a database.

The descrambler 205 reconstructs data of a payload for a scrambled packet payload in the MPEG-2 TP using an encryption key or the like delivered from a conditional access (CA) stream handler 216.

The MPEG-2 TP demultiplexer 206 filters off an MPEG-2 TP varied on a VSB signal or a TP, which is attempted to be processed by the receiver, among the MPEG-2 TP stored in the PVR storage 207 and then relays the filtered TP to a proper processing module. In this case, the MPEG-2 TP demultiplexer 206 can be controlled by the service manager 228 and the PVR manager 235.

The PVR storage 207 stores the received MPEG-2 TP using the VSB signal according to a request made by a user and then outputs the MPEG-2 TP according to a request made by a user. In this case, the PVR storage 207 can be controlled by the PVR manager 235.

The part of the stream component handler includes a packetized elementary stream (PES) buffer/handler 208, an elementary stream (ES) buffer/handler 209, a program clock reference (PCR) handler 210, a system time clock (STC) unit 211, a digital storage media command and control (DSM-CC) section buffer/handler 212, an IP datagram buffer/header parser 213, a user datagram protocol (UDP) datagram buffer/handler 213, a CA stream buffer/handler 214 and a service signaling section buffer/handler 215.

The PES buffer/handler 208 buffers and reconstructs a PES carried on an MPEG-2 TS.

The ES buffer/handler 208 buffers and reconstructs an ES such as audio data, video data or the like, which is transmitted as a PES, and then delivers the reconstructed ES to a proper A/V decoder 218.

The PCR handler 210 handles PCR data used for time synchronization of audio and video streams or the like.

The STC unit 211 corrects a clock value of the A/V decoder 218 using a reference clock value delivered via the PCR handler 210 to enable time synchronization.

The DSM-CC section buffer/handler 212 buffers and handles DSM-CC section data for a file transmission via the MPEG-2 TP, an IP datagram encapsulation or the like.

The IP datagram buffer/header parser 213 buffers and reconstructs an IP datagram, which is encapsulated via DSM-CC addressable section and is then carried on an MPEG-2 TP. The IP datagram buffer/header parser 213 parses a header of each IP datagram through the reconstruction. In this case, the IP datagram buffer/header parser 213 is controlled by the service manager 228.

If scrambling is applied to a payload in the received IP datagram, the descrambler 214 reconstructs data of the payload using an encryption key for the payload or the like delivered from the CA stream handler 216.

The UDP datagram buffer/handler 215 buffers and reconstructs a UDP datagram carried on an IP datagram and also parses and processes a UDP header.

The CA stream buffer/handler 216 buffers and handles such data as a key value for descrambling, e.g., an entitlement management message (EMM) transmitted for a conditional access function carried on an MPEG-2 TS or an IP stream, an entitlement control message (ECM) and the like. In this case, an output of the CA stream buffer/handler 216 is delivered to the descrambler 214 to perform a decryption operation of an MPEG-2 TP or an IP datagram that carries AV data, file data and the like.

The service signaling section buffer/parser 217 processes an NRT Service Table (NST), an NRT Content Table (NCT) and descriptors related to the NST or the NCT for signaling an NRT service of the present invention, which will be explained later. The processed signaling information is transferred to the NRT service manager 229.

The part of the media handler is explained as follows. First of all, the part of the media handler includes A/V decoders 218.

The AV decoders 218 decode compressions of audio and vide data delivered via the ES handler 209 and then processes the decoded data, which are to be presented to a user.

The part of the file handler is explained as follows. First of all, the part of the file handler mainly includes an Asynchronous Layered Coding/Layered Coding Transport (ALC/CLT) buffer/parser 219, a file description table (FDT) handler 220, an extensible markup language (XML) parser 221, a file reconstruction buffer 222 and a decompressor 223.

The ALC/LCT buffer/parser 219 buffers and reconstructs ALC/LCT data carried on UDP/IP stream and then parses a header of ALC/LCT and a header extension thereof. In this case, the ALC/LCT buffer/parser 219 can be controlled by the NRT service manager 229.

The FDT handler 220 parses and processes a FDT of a File Delivery over Unidirectional Transport (FLUTE) protocol transmitted via an ALC/LCT session. It is able to transfer the processed FDT to the NRT service manager 229. In this case, the FDT handler 220 can be controlled by the NRT service manager 229.

The XML parser 221 parses an XML document transmitted via the ALC/LCT session and then delivers the parsed data to such a proper module as the FDT handler 220, the SG handler 227 and the like.

The file reconstruction buffer 222 reconstructs a file transferred to the ALC/LCT and FLUTE session.

If the file transferred to the ALC/LCT and FLUTE session is compressed, the decompressor 223 performs a process for decompressing the compression.

The file decoder 224 decodes a file reconstructed by the file reconstruction buffer, a file decompressed by the decompressor 223 or a file extracted from the file storage 225.

The file storage 225 stores and extracts the received file. In this case, the received file may contain NRT content.

Finally, the remaining parts except for the above-described units are explained as follows.

First of all, a middleware (M/W) engine 226 processes data of a file that is not an AV stream transferred via a DSM-CC section, an IP diagram and the like and then delivers the processed data to the presentation manager 234.

The SG handler 227 collects and parses service guide data transferred in an XML document format and then delivers the parsed data to the EPG manager 230.

The service manager 228 produces a service map by collecting and parsing PSI/PSIP data carried on MPEG-2 TS and service signaling section data carried on an IP stream and then controls an access to a service specified by a user by storing the service map in a service map & guide database. In this case, the service manager 228 is controlled by an operation controller 230 and then controls the tuner 201, the MPEG-2 TP demultiplexer 206, the IP datagram buffer/handler 213, the NRT service manager 229 and the like.

The NRT service manager 229 performs overall managements on the NRT service transferred in an object/file format via FLUTE session on an IP layer. The NRT service manager 229 parses the signaling information transferred from the service signaling section buffer/parser 217. And, the parsed signaling information is transferred to the service map & guide database 236 to be stored therein. Moreover, the NRT service manager 229 controls NCT information, which correspond to contents related to a service guide in the signaling information, to be transferred to the EPG manager 230, thereby forming EPG data. In this case, the NRT service manager 229 controls the FDT handler 220, the file storage 225 and the like. Therefore, the NRT service manager 229 receives the FDT from the FDT handler 220, parses the received FDT and then controls received NRT contents to be stored as a hierarchical structure in the file storage 225. And, the NRT service manager 229 controls the corresponding NRT contents to be extracted from the file storage 225 in case that a user makes a selection for the NRT service.

The EPG manager 230 receives the service guide data from the SG handler 227, configures EPG data, and then controls the EPG data to be displayed.

The application manager 231 performs overall managements on processing of application data transferred in such a format as an object, a file and the like.

The user interface (UI) manager 232 delivers an input of a user via a UI to the operation controller 233 and enables an operation of a process for a user-requested service to be initiated.

The operation controller 233 processes a user's command delivered via the UI manager 232 and then enables a manager of a necessary module to perform a corresponding action.

And, the presentation manager 234 provides at least one of A/V data outputted from the A/V decoder 218, file data outputted the middleware (M/W) engine 226 and EPG data outputted from the EPG manager 230 to user via speaker and/or screen.

A Description for Relations Among NRT Service, Content Item and File

Figure 3:
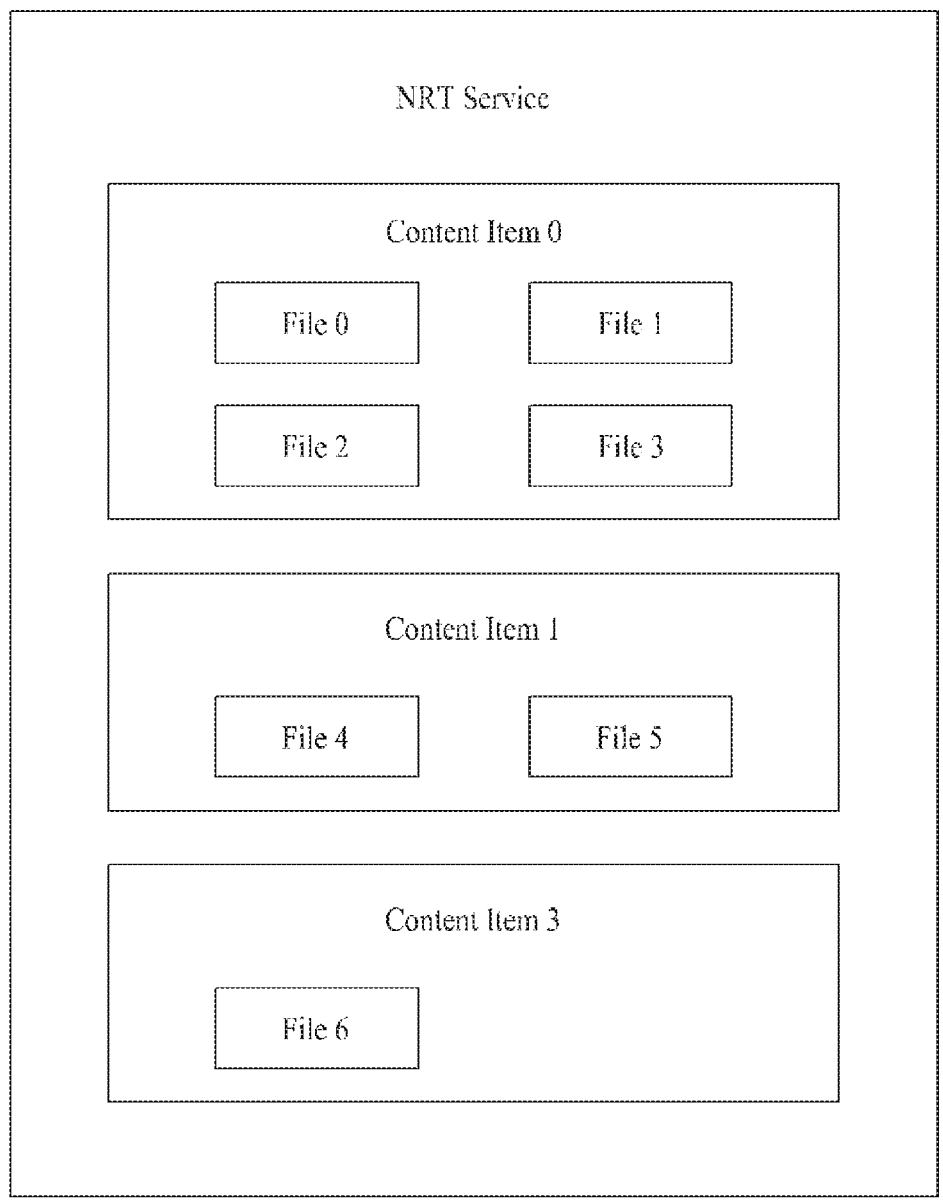
FIG. 3 is an exemplary diagram explaining relations between an NRT service, content items and files.

FIG. 3 is an exemplary diagram explaining relations between an NRT service, content items and files.

Referring to FIG. 3, an NRT service can include one or more content items. And, each of the content items can include one or more files. And, each of the content items is an independently playable entity and may correspond to a program or an event in a real time broadcast. Therefore, the NRT service means a group that is serviceable with a combination of the above content items. And, the NRT service corresponds to a channel concept in real time.

In order for a receiver to properly process the above NRT service, signaling for the corresponding NRT service is required. The present invention intends to properly process an NRT service received by a receiver by defining and providing the signaling information. Besides, details of the signaling information shall be described in the description of the corresponding part.

A Protocol for a Fixed NRT Service

First of all, NRT services can be mainly categorized into a fixed NRT service and a mobile NRT service. In the following description, the fixed NRT service is taken as an example for clarity and convenience of explanation.

Figure 4:
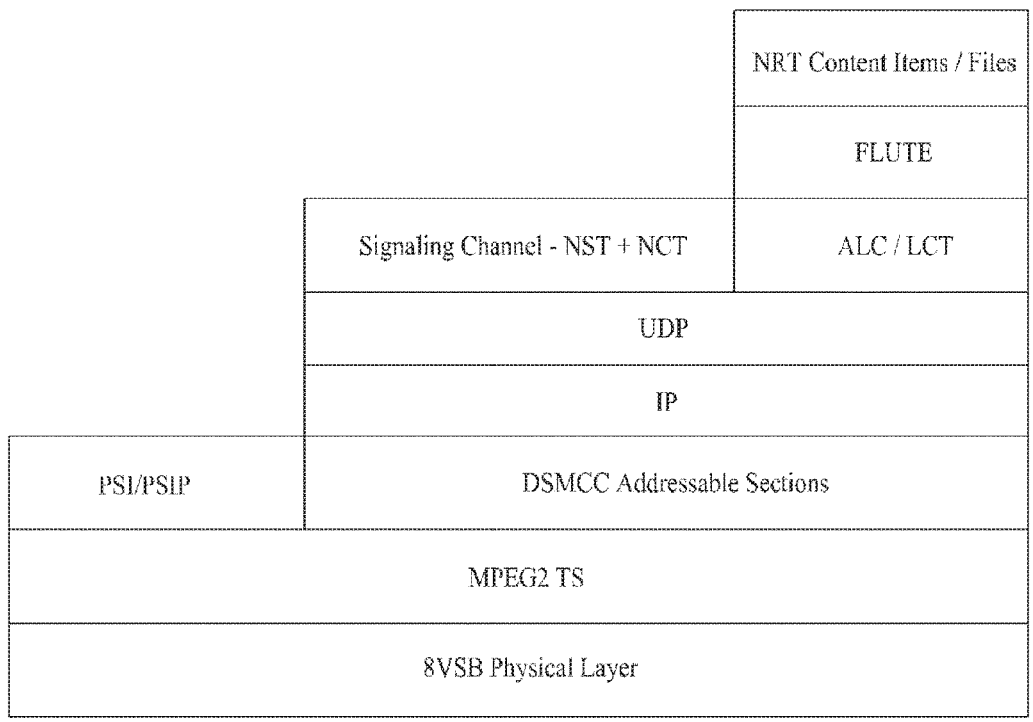
FIG. 4 is a diagram for a protocol stack of a fixed NRT service configured according to an embodiment of the present invention.

FIG. 4 is a diagram for a protocol stack of a fixed NRT service configured according to an embodiment of the present invention.

Referring to FIG. 4, a protocol stack for providing a fixed NRT service transmits NRT content items/files, IP datagram including a signaling channel for providing NST and NCT and PSI/PSIP data using an MPEG-2 TS format.

In FIG. 4, the fixed NRT service is packetized according to UDP in an IP layer. The UDP packet becomes UDP/IP packet data by being packetized again according to an IP scheme. In this disclosure, the packetized UDP/IP packet data is referred to as an IP datagram for simplicity.

The NRT content items/files are packetized according to FLUTE scheme or ALC/LCT scheme. The ALC/LCT packet is transported by being encapsulated in a UDP datagram. The ALC/LCT/UDP packet is packetized into ALC/LCT/UDP/IP packet according to IP datagram scheme to become an IP datagram. This IP datagram is contained in MPEG-2 TS through DSM-CC addressable sections for transport. In this case, the ALC/LCT/UDP/IP packet is the information on FLUTE session and includes a FDT as well.

A signaling information channel including an NST and an NCT is packetized according to a UDP scheme. This UDP packet is packetized according to an IP scheme again to become UDP/IP packet data, i.e., IP datagram. This IP datagram is also contained in the MPEG-2 TS through the DSM-CC addressable sections for transport.

And, a PSI/PSIP table is separately defined and contained in the MPEG-2 TS.

The MPEG-2 TS containing the above described NRT content items/files, signaling information channel and PSI/PSIP data therein are transferred by being modulated by a predetermined transmission scheme such as VSB transmission scheme.

NRT Service Method

According to the present invention, a fixed NRT service uses a conventional ATSC terrestrial broadcasting environment. In particular, a fixed NRT service, which is based on a scheme of transporting an IP datagram via DSM-CC addressable section, can be provided by the following method for example.

1. Case of Transmission on Virtual Channel Including Audio and/or Video:

In this case, a service type of a corresponding virtual channel can follow FIG. 5 as stipulated in the conventional ATSC specification. In particular, the service type follows '0x04' indicating ATSC data only service shown in FIG. 5. Alternatively, the service type can identify an NRT service by being included in another service type of the related art.

2. Case of Transmission on Virtual Channel Including NRT Service Only:

Referring to FIG. 6, signaling can be performed to indicate an NRT application ('0x08') by allocating a new service type value.

A Terrestrial Virtual Channel Table (TVCT)

FIG. 7 is a diagram for a bit-stream section of a TVCT section configured according to an embodiment of the present invention.

Referring to FIG. 7, a TVCT section is described as having a table format similar to that of an MPEG-2 private section. However, this is merely exemplary, and the present invention will not be limited to the example given herein.

The TVCT can be divided into a header, a body and a trailer. The header part ranges from table_id field to protocol_version field. And, transport_stream_id field is a 16-bit field and indicates an MPEG-2 TSID within a program association table (PAT) defined by a PID value of '0' for multiplexing. In the body part, num_channels_in_section field is an 8-bit field and indicates the number of virtual channels within a VCT section. Finally, the trailer part includes CRC_32 field.

First of all, the header part is explained as follows.

A table_id field is an 8-bit unsigned integer number that indicates the type of table section being defined herein. For the terrestrial_virtual_channel_table_section( ), the table_id shall be '0xC8'.

A section_syntax_indicator is a one-bit field which shall be set to '1' for the terrestrial_virtual_channel_table_section( ).

A private_indicator field (1-bit) shall be set to '1'.

A section_length is a twelve bit field, the first two bits of which shall be '00'. This field specifies the number of bytes of the section, starting immediately following the section_length field, and including the CRC. The value in this field shall not exceed 1021.

A table_id_extension field is set to '0x000'.

A version_number field (5-bit) represents the version number of the VCT.

A current_next_indicator is a one-bit indicator, which when set to '1' indicates that the VCT sent is currently applicable.

A section_number field (8 bit) gives the number of this section. The section_number of the first section in the TVCT shall be '0x00'.

A last_section_number field (8 bit) specifies the number of the last section (that is, the section with the highest section_number) of the complete TVCT.

A protocol_version is an 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.

The body part is explained as follows.

A num_channels_in_section field (8-bit) specifies the number of virtual channels in this VCT section. The number is limited by the section length.

A short_name field represents the name of the virtual channel, represented as a sequence of one to seven 16-bit code values.

A major_channel_number field is a 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel.

A minor_channel_number field is a 10-bit number in the range '0' to '999' that represents the "minor" or "sub"-channel number. This field, together with major_channel- _number, performs as a two-part channel number, where minor_channel_number represents the second or right-hand part of the number. When the service_type is analog television, minor_channel_number shall be set to '0'. Services whose service_type is either ATSC_digital_television or ATSC_audio_only shall use minor numbers between '1' and '99'. The value of minor_channel_number shall be set such that in no case is a major_channel_number/minor_channel_number pair duplicated within the TVCT.

A modulation_mode field is an 8-bit unsigned integer number that indicates the modulation mode for the transmitted carrier associated with this virtual channel.

A carrier_frequency field includes the recommended value for these 32 bits is zero. Use of this field to identify carrier frequency is allowed, but is deprecated.

A channel_TSID is a 16-bit unsigned integer field in the range '0x0000' to '0xFFFF' that represents the MPEG-2 TSID associated with the TS carrying the MPEG-2 program referenced by this virtual channel.

A program_number field is a 16-bit unsigned integer number that associates the virtual channel being defined here with the MPEG-2 PROGRAM ASSOCIATION and TS PROGRAM MAP tables. For virtual channels representing analog services, a value of '0xFFFF' shall be specified for program_number.

An ETM_location is 2-bit field specifies the existence and the location of an Extended Text Message (ETM).

An access_controlled is a 1-bit Boolean flag that indicates, when set, that the events associated with this virtual channel may be access controlled. When the flag is set to '0', event access is not restricted.

A hidden is a 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.

A hide_guide is a Boolean flag that indicates, when set to '0' for a hidden channel that the virtual channel and its events may appear in EPG displays. This bit shall be ignored for channels which do not have the hidden bit set, so that non-hidden channels and their events may always be included in EPG displays regardless of the state of the hide_guide bit. Typical applications for hidden channels with the hide_guide bit set to '1' are test signals and services accessible through application-level pointers.

A service_type is a 6-bit enumerated type field that shall identify the type of service carried in this virtual channel.

A source_id field (16-bit) represents a programming source associated with a virtual channel.

A descriptors_length field is total length (in bytes) of the descriptors for this virtual channel that follows.

A descriptor( ) field includes zero or more descriptors, as appropriate, may be included.

An additional_descriptors_length field is total length (in bytes) of the VCT descriptor list that follows.

The trailor part is explained as follows. CRC_32 is a 32-bit field that contains the cyclic redundancy check (CRC) value that ensures a zero output from the registers in the decoder.

NRT content is transferred through IP mechanism. In order to transfer IP datagram through a digital broadcast stream, ATSC has regulated ATSC A/90 and A/92 specifications.

In the above description, the data service table (DST) may be received through a PID included in service_location_descriptor. And, it is able to know a type of application and detailed information of a data broadcast stream carried on this channel through the DST.

According to FIG. 5, it is able to use a DST to identify an NRT service. The DST is explained as follows.

FIG. 8 is a diagram for a bit-stream syntax of a DST section to identity an NRT application configured according to an embodiment of the present invention.

The semantics of the fields comprising the data_service_table_bytes structure are defined below.

An sdf_protocol_version field (8-bit) shall be used to specify the version of the Service Description Framework (SDF) protocol. The value of this field shall be set to '0x01'. The value '0x00' and the values in the range '0x02' to '0xFF' shall be ATSC reserved.

An application_count_in_section field (8-bit) shall specify the number of applications listed in the DST section.

A compatibility_descriptor( ) field shall contain a DSM-CC compatibility descriptor. Its purpose shall be to signal compatibility requirements of the application so that the receiving platform can determine its ability to use this data service.

An app_id_byte_length field (16-bit) shall specify the number of bytes used to identify the application. The value of this field shall account for the length of both the app_id_description field and the app_id_byte fields that follow. The value '0x0000' shall indicate that no app_id_description field or app_id_byte fields follow. The value '0x0001' is forbidden.

An app_id_description field (16-bit) shall specify the format and semantics of the following application identification bytes.

Table 1 specifies the values and associated formats.

TABLE 1

| Value | Application Identifier Format |
|---|---|
| 0x0000 | DASE application |
| 0x0001 | ATSC reserved |
| 0x0002 | ATSC A/92 Application |
| 0x0003 | NRT Application |
| 0x0004-0x7FFF | ATSC reserved |
| 0x8000-0xFFFF | User private |

An app_id_byte field (8-bit) shall represent a byte of the application identifier.

A tap_count field (8-bit) shall specify the number of Tap( ) structures used by this application.

A protocol_encapsulation field (8-bit) shall specify the type of protocol encapsulation used to transmit the particular data element referred to by the Tap( ).

TABLE 2

| Value | Encapsulated Protocol |
|---|---|
| 0x00 | Not in a MPEG-2 Transport Stream |
| 0x01 | Asynchronous non-flow controlled scenario of the DSM-CC Download protocol encapsulated in DSM-CC sections |
| 0x02 | Non-streaming Synchronized Download protocol encapsulated in DSM-CC sections |
| 0x03 | Asynchronous multiprotocol datagrams in Addressable Sections using LLC/SNAP header |
| 0x04 | Asynchronous IP datagrams in Addressable Sections |
| 0x05 | Synchronized streaming data encapsulated in PES |
| 0x06 | Synchronous streaming data encapsulated in PES |

TABLE 2-continued

| Value | Encapsulated Protocol |
|---|---|
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |
| 0x0D | Asynchronous carousel scenario of the DSM-CC Download protocol encapsulated in DSM-CC sections |
| 0x0E | Reserved for harmonization with another standard body |
| 0x0F-0x7F | ATSC reserved |
| 0x80-0Xff | User defined |

An action_type field (7-bit) shall be used to indicate the nature of the data referred to by the Tap( ).

A resource_location field (1-bit) shall specify the location of the Association Tag field matched with the association_tag value listed in the following Tap structure. This bit shall be set to '0' when the matching association_tag resides in the PMT of the current MPEG-2 program. This bit shall be set to '1' when the matching association_tag resides in a DSM-CC Resource Descriptor within the Network Resources Table of this Data Service.

A tap_id field (16-bit) shall be used by the application to identify the data elements. The value of tap_id is scoped by the value of the app_id_byte fields associated with the Tap ( ) in the DST. The tap_id field is unique within an application. The tap_id value is selected by the data service provider at authoring time. It is used in the application as a handle to the data element.

A use field (16-bit) is used to characterize the communication channel referenced by the association_tag. Use of use values other than '0x0000' is beyond the scope of this standard. The use value '0x0000' indicates that this field is unknown.

An association_tag field (16-bit) shall uniquely identify either a data elementary stream listed in the PMT or a DSM-CC Resource Descriptor listed in the Network Resource Table. In the former case, the value of this field shall be matched with the association_tag value of an association_tag_descriptor in the PMT of the data service. In the latter case, the value of this field shall match the association_tag value in the commonDescriptorHeader structure of a DSM-CC Resource Descriptor in the Network Resource Table of the data service.

A selector( ) field shall specify a particular data element available in a data elementary stream or a communication channel referenced by the association_tag field. In addition, the selector structure may indicate the protocol required for acquiring this data element.

A tap_info_length field (16-bit) shall specify the number of bytes of the descriptors following the tap_info_length field.

A descriptor( ) field shall follow the descriptor format.

An app_info_length field (8-bit) shall specify the number of bytes of the descriptors following the app_info_length field.

Another descriptor( ) field shall follow the descriptor format.

An app_data_length field (16-bit) shall specify the length in bytes of the following app_data_byte fields.

An app_data_byte field (8-bit) shall represent one byte of the input parameters and other private data fields associated with the application.

A service_info_length (8-bit) shall specify the number of bytes of the descriptors following the service_info_length field.

Another descriptor( ) field shall follow the descriptor format.

A service_private_data_length field (16-bit) shall specify the length in bytes of the private fields to follow.

A service_private_data_byte field (8-bit) shall represent one byte of the private field.

After the NRT application has been identified, an IP stream, on which a well-known IP address for delivering NRT service signaling data delivered via an IP layer, is searched for using tap information.

If a value of protocol_encapsulation is set to '0x04', an asynchronous IP datagram is transferred. If selector_type is set to '0x0102', a value of device_id, which indicates a destination address, is delivered through selector_bytes. In order to accurately interpret a value of the selector_bytes, multiprotocol_encapsulation_descriptor is used. And, the number of valid bytes in the device_id value is signaled.

Therefore, it is able to know a multicast address (or, an address range) of an IP datagram carried on the corresponding PID via the tap information.

It is checked whether a well-known IP address, to which NRT service signaling data will be delivered, is loaded on the tap. This is received in the first place. An IP packet is then received.

The NRT service signaling data is extracted from the IP packet. The extracted NRT service signaling data is delivered to and processed by an NRT application manager. An NRT service can be then initiated.

As mentioned in the above description, an NRT service signaling channel is multicasted by being encapsulated in an IP datagram via a well-known IP address.

Figure 9:
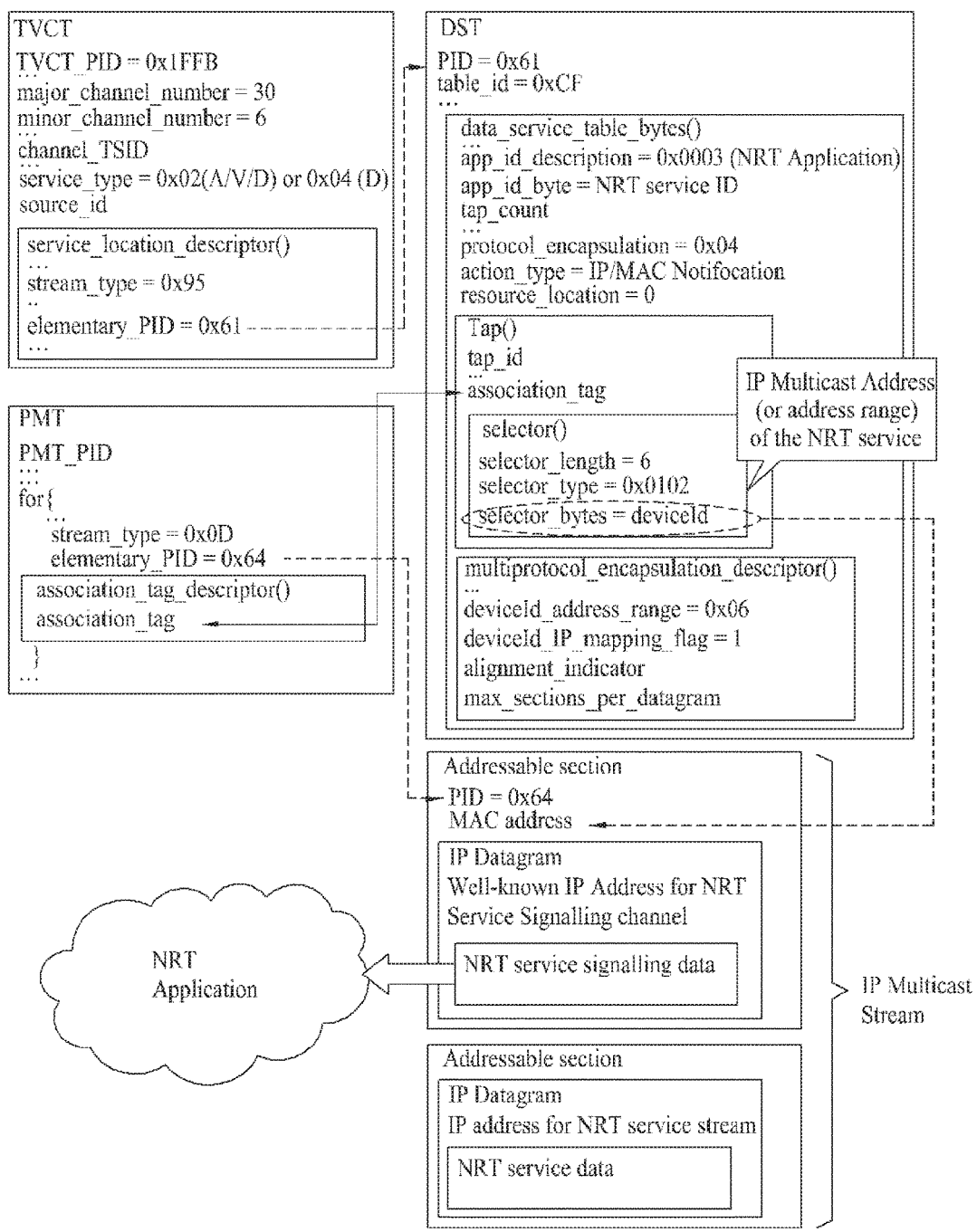
FIG. 9 is a diagram for a signaling method in case of transmitting an NRT service through an ATSC broadcasting system according to another embodiment of the present invention.
Figure 10:
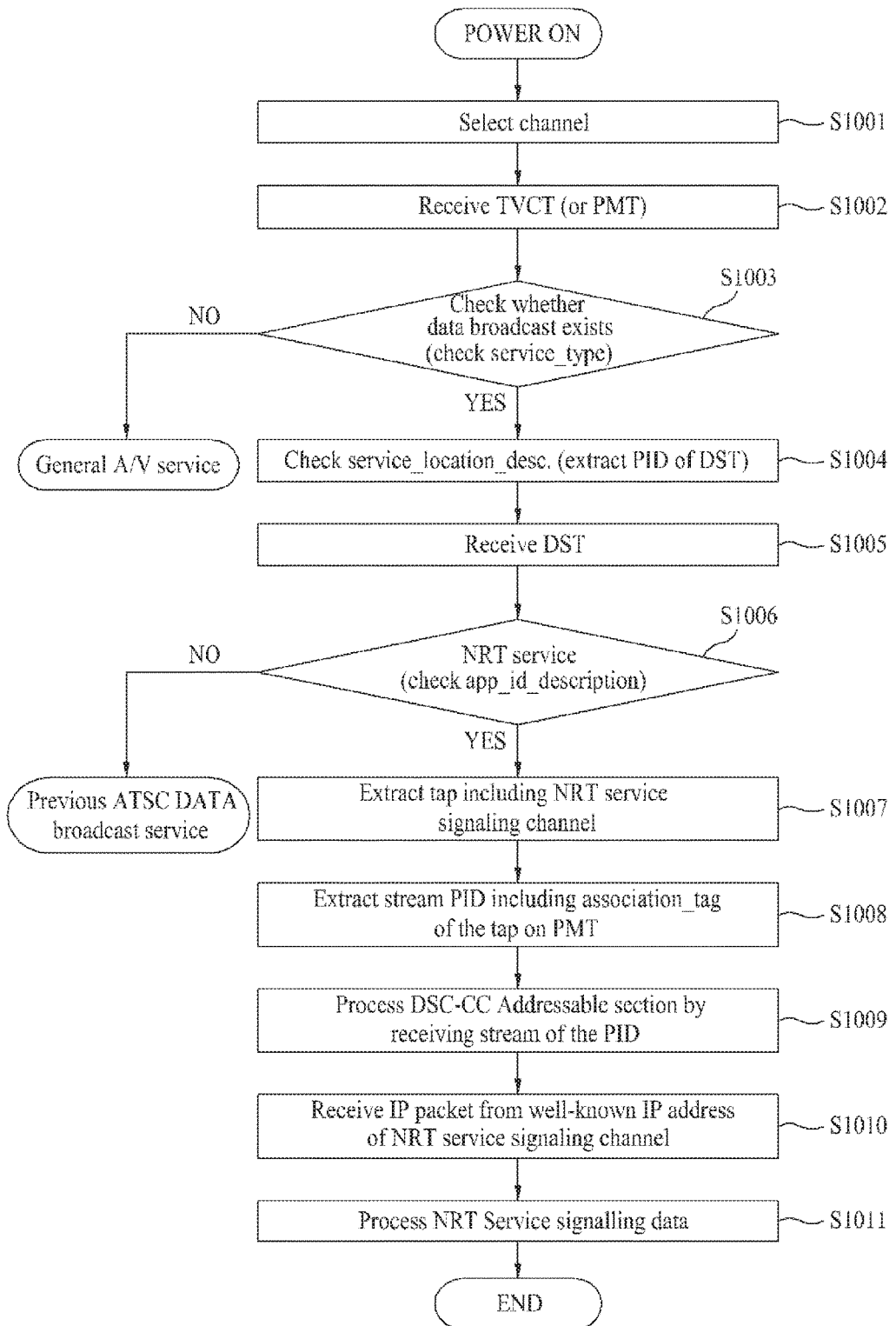
FIG. 10 is a flowchart for FIG. 9.

FIG. 9 is an exemplary diagram for a signaling method in case of transmitting an NRT service through an ATSC broadcasting system according to another embodiment of the present invention, and FIG. 10 is an exemplary flowchart for FIG. 9.

FIG. 9 shows a method of configuring a separate NRT service signaling channel via an IP side. In this case, the NRT service signaling channel is multicasted by being encapsulated in an IP datagram via a well-known IP address. A signaling structure for this case is shown in FIG. 9. In particular, it can be observed that a separate NRT service signaling channel exists as an IP multicast stream, whereas every signaling is performed by a PSIP side.

Referring to FIG. 10, after a power of a receiver has been turned on, if a default channel or a channel by a user is selected [S1001], the receiver receives a TVCT or a PMT [S1002].

Regarding this, information on a stream configuring each virtual channel is signaled to service_location_descriptor or the TVCT or the ES_loop of the PMT.

Therefore, the receiver determines a type of a service provided on a selected channel by parsing service_type within the received TVCT [S1003]. For instance, if a value of the service_type is set to '0x02', a type of a corresponding service provided on the selected channel may mean a digital A/V/Data service type. If a value of the service_type is set to '0x04', a type of a corresponding service provided on the selected channel may mean a data only service type. If a value of the service_type is set to '0x08', a type of a corresponding service provided on the selected channel may mean an NRT only service type.

As a result of the determining step S1003, if the corresponding service type is not a general A/V service, PID ('0x61') of a data service table (DST) is extracted by parsing service_location_descriptor in the channel loop of the TVCT [S1004].

Subsequently, the DST is received using the extracted PID [S1005].

It is then determined whether the corresponding service provided on the selected channel is an NRT service from the received DST [S1006]. In doing so, the determination of a presence or absence of the NRT service can be performed by checking app_id_description within the DST. For instance, if a value of the app_id_description is set to '0x0003', it means that the corresponding service is the NRT application.

As a result of the determining step S1006, if the corresponding service is the NRT service, a tap including an NRT service signaling channel is extracted [S1007]. And, stream_PID including association_tag of the tap on the PMT is extracted [S1008].

After a stream of the PID has been received, a DSM-CC addressable section is processed [S1009].

Subsequently, after an IP packet has been received from a well-known IP address of the NRT service signaling channel [S1010], an NRT service is provided by processing the NRT service signaling data within the received IP packet [S1011].

Regarding this, after whether the NRT application exists on the virtual channel has been checked by the above method, an IP stream carrying the well-known IP address, to which the NRT service signaling data carried via an IP layer is delivered, is searched for using tap information.

If a value of protocol_encapsulation is set to '0x04', an asynchronous IP datagram is transferred. If selector_type is set to '0x0102', a value of device_id indicating a destination address is delivered via selector_bytes.

Therefore, it is able to know a PID of a transport stream, on which the corresponding data is carried, through the tap information on a multicast address (or, an address range) of an IP diagram. It is checked whether a well-known IP address, to which NRT service signaling data will be delivered, is loaded on the tap. This is received in the first place. An IP packet is then received.

Subsequently, NRT service signaling data is extracted from the IP packet. The extracted NRT service signaling data is delivered to an NRT application manager. A corresponding service is then initiated.

NST & NCT

In the following description, NST and NCT carried on a signaling information channel and accompanied descriptors thereof for providing information for signaling an NRT service are explained in order.

As mentioned in the foregoing description of FIG. 3, an NST/NCT table section can be transferred by being included as an IP stream within a virtual channel.

Examples for fields carried on NST are described as follows. FIGS. 11 and 12 are an exemplary diagram for a bit-stream syntax of NST configured according to an embodiment of the present invention.

In this case, although a corresponding syntax is written as an MPEG-2 private section to help the understanding, a format of corresponding data can have any type. For instance, SDP ( ) is used to perform signaling via a SAP (session announcement protocol).

NST/NCT describes service information and IP access information within a virtual channel carrying the NST/NCT. The NST/NCT also provides broadcast stream information of a corresponding service using TSID that is an identifier of a broadcast stream to which each service belongs. And, NST according to the present embodiment includes description information of each fixed NRT service within one virtual channel. And, other side information can be included in a descriptor region.

A table_id field is an 8-bit unsigned integer number that indicates the type of table section being defined in NST.

A section_syntax_indicator field (1-bit) shall be set to '0' to always indicate that this table is derived from the short form of the MPEG-2 private section table.

A private_indicator field (1-bit) shall be set to '1'.

A section_length field (12-bit) specifies the number of remaining bytes this table section immediately following this field. The value in this field shall not exceed 4093 ('0xFFD').

A table_id_extension field (16-bit) is table-dependent. It shall be considered to be logically part of the table_id field providing the scope for the remaining fields. Herein, the table_id_extension field includes an NST_protocol_version field.

The NST_protocol_version is an 8-bit unsigned integer field whose function is to allow, in the future, this NRT Service Table to carry parameters that may be structured differently than those defined in the current protocol. At present, the value for the NST_protocol_version shall be zero. Non-zero values of NST_protocol_version may be used by a future version of this standard to indicate structurally different tables.

A version_number field (5-bit) represents a version number of the NST.

A current_next_indicator is a one-bit indicator, which when set to '1' shall indicate that the NRT Service Table sent is currently applicable. When the bit is set to '0', it shall indicate that the table sent is not yet applicable and will be the next table to become valid. This standard imposes no requirement that next tables (those with current_next_indicator set to '0') must be sent. An update to the currently applicable table shall be signaled by incrementing the version_number field.

A section_number field (8-bit) shall give the section number of this NRT Service table section. The section_number of the first section in an NRT Service table shall be '0x00'. The section_number shall be incremented by 1 with each additional section in the NRT Service table.

A last_section_number field (8-bit) shall give the number of the last section (i.e., the section with the highest section_number) of the NRT Service table of which this section is a part.

A carrier_frequency field (32-bit) indicates transport frequency corresponding to a channel.

A channel_TSID field (16-bit) represents a transport stream including an MPEG-2 program referenced to a virtual channel and an MPEG-2 TSID associated with the transport stream.

A source_id field (16-bit) represents a programming source associated with a virtual channel.

A num_NRT_services field (8-bit) specifies the number of NRT services in this NST section.

According to an embodiment of the present invention, an NST provides information for a plurality of fixed NRT services using a 'for' loop. Field information which is included in each fixed NRT service is explained as follows.

An NRT_service status is a 2-bit enumerated field that shall identify the status of this NRT Service. The most significant bit shall indicate whether this NRT Service is active (when set to '1') or inactive (when set to '0') and the least significant bit shall indicate whether this NRT Service is hidden (when set to '1') or not (when set to '0'). Hidden services are normally used for proprietary applications, and ordinary receiving devices should ignore them.

A SP_indicator is a 1-bit field that shall indicate, when set, that service protection is applied to at least one of the components needed to provide a meaningful presentation of this NRT Service.

A CP_indicator is a 1-bit field that shall indicate, when set, that content protection is applied to at least one of the components needed to provide a meaningful presentation of this NRT Service.

An NRT_service_id is a 16-bit unsigned integer number that shall uniquely identify this NRT Service within the scope of this NRT Broadcast. The NRT_service_id of a service shall not change throughout the life of the service. To avoid confusion, it is recommended that if a service is terminated, then the NRT_service_id for the service should not be used for another service until after a suitable interval of time has elapsed.

A short_NRT_service_name_length is a three-bit unsigned integer that shall indicate the number of byte pairs in the short_NRT_service_name field. This value is shown as m in the No. of Bits column for the short_NRT_service_name field. When there is no short name of this NRT service, the value of this field shall be '0'.

A short_NRT_service_name field is a short name of the NRT Service. When there is no short name of this NRT Service, this field shall be filled with NULLs ('0x00').

An NRT_service_category is a 6-bit enumerated type field that shall identify the type of service carried in this IP Service.

A num_components field (5-bit) specifies the number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of 1 for this field is reserved for possible future indication that source_IP_address, NRT_service_destination_IP_address, and component_destination_IP_address fields are for IPv6.

A source_IP_address_flag is a 1-bit Boolean flag that shall indicate, when set, that a source IP address value for this NRT Service is present to indicate a source specific multicast.

An NRT_service_destination_IP_address_flag is a 1-bit Boolean flag that indicates, when set to '1', that an NRT_service_destination_IP_address value is present, to serve as the default IP address for the components of this NRT Service).

A source_IP_address field shall be present if the source_IP_address flag is set to '1' and shall not be present if the source_IP_address flag is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address field shall be present if the NRT_service_destination_IP_address flag is set to '1' and shall not be present if the NRT_service_destination_IP_address flag is set to '0'. If this NRT_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined.

According to an embodiment of the present invention, the NST provides information for a plurality of components using a 'for' loop.

An essential component indicator is a one-bit indicator which, when set to '1', shall indicate that this component is an essential component for the NRT Service. Otherwise, this field indicates that this component is an optional component.

A port_num_count field shall indicate the number of destination UDP ports associated with this UDP/IP stream component. The values of the destination UDP port numbers shall start from the component_destination_UDP_port_num field and shall be incremented by one.

A component_destination_IP_address_flag is a 1-bit Boolean flag that shall indicate, when set to '1', that the component_destination_IP_address is present for this component.

A component_destination_IP_address field shall be present if the component_destination_IP_address flag is set to '1' and shall not be present if the component_destination_IP_address flag is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined.

A component_destination_UDP_port_num is a 16-bit unsigned integer field that represents the destination UDP port number for this UDP/IP stream component.

A num_component_level_descriptors is a 16-bit unsigned integer field, that represents the number of descriptors providing additional information for IP stream component, may be included.

A component_level_descriptors field includes one or more descriptors providing additional information for this IP stream component, may be included.

A num_NRT_service_level_descriptors field (4 bit) specifies the number of NRT service level descriptors for this service.

An NRT_service_level_descriptor( ) field includes zero or more descriptors providing additional information for this NRT Service, may be included. This detailed service type can include a portal service for providing web contents, Push VOD, A/V download or the like.

A num_virtual_channel_level_descriptors field (4-bit) specifies the number of virtual channel level descriptors for this virtual channel.

A virtual_channel_level_descriptor( ) includes zero or more descriptors providing additional information for the virtual channel which this NST describes, may be included.

An NRT service is transferred via FLUTE and access information in an NST table is connected to FLUTE session information as follows. A Source_IP_address becomes a source IP address of a same server that transmits all channels of FLUTE session. NRT_service_destination_IP_Address is signaled if there exists a destination IP address at a session level of this FLUTE session.

A component can be mapped to a channel within a FLUTE session and can signal a separate destination IP address per channel (this is different from an IP address signaled by a session unit) through component_destination_IP_address. Moreover, a destination port number is signaled through component_destination_UDP_port_num. And, it is able to additionally designate the number of destination ports starting from component_destination_UDP_port_num through port_num_count.

By designating ports to a plural number, it is able to construct a plurality of channels for one destination IP address. In this case, one component is able to designate a plurality of channels. Yet, it is preferable that a channel is identified via a destination IP address in general. In this case, one channel can be regarded as mapped to one component.

Content items/files for an NRT service are transferred through FLUTE and corresponding FLUTE session information is signaled using access information in an NST table. FIG. 13 is an exemplary diagram for a bit-stream syntax of NRT_component_descriptor( ) configured according to an embodiment of the present invention.

An NRT_component_descriptor( ) shall appear in the component descriptor loop of each component of each NRT Service in the NST and all parameters in the descriptor shall correspond to the parameters in use for that component of the NRT Service.

In the following description, each field information carried on NRT_component_descriptor shown in FIG. 13 is described.

A descriptor tag is 8-bit unsigned integer. It shall have the value, identifying this descriptor as the NRT_component_descriptor.

A descriptor_length is 8-bit unsigned integer shall specify the length (in bytes) immediately following this field up to the end of this descriptor).

A component_type field (7-bit) shall identify the encoding format of the component. The value may be any of the values assigned by IRNA for the payload_type of an RTP/AVP stream [10], or it may be any of the values in Table 3 assigned by this document, or it may be a "dynamic value" within the range of 96 to 127. For components consisting of media carried via RTP, the value of this field shall match the value in the payload_type field in the RTP header of the IP stream carrying this component.

Note that additional values of the component_type field within the range of 43 to 71 can be defined in future versions of this standard. The NRT service stream transmitted through FLUTE protocol further requires parameters further to signal a FLUTE session as a Table 3. In the Table 3, '38' of component_type being defined for FLUTE component in the ATSC or '43' of component_type newly being defined for transmission NRT may be used.

TABLE 3

| component_type | Meaning |
| --- | --- |
| 0-34 | Assigned or reserved by IANA, except that 20-24, 27, and 29-30 are unassigned |
| 35 | H.264/AVC video stream component (assigned by ATSC use) |
| 36 | SVC enhancement layer stream component (assigned by ATSC use) |
| 37 | HE AAC v2 audio stream component (assigned by ATSC use) |
| 38 | FLUTE file delivery session (assigned by ATSC use) |
| 39 | STKM stream component (assigned by ATSC use) |
| 40 | LTKM stream component (assigned by ATSC use) |
| 41 | OMA-RME DIMS stream component (assigned by ATSC use) |
| 42 | NTP timebase stream component (assigned by ATSC use) |
| 43-71 | [Unassigned by IANA and reserved by ATSC use] |
| 72-76 | Reserved by IANA |
| 77-95 | Unassigned by IANA |
| 96-127 | Designated by IANA for dynamic use |

A num_STKM_streams is an 8-bit unsigned integer field that shall identify the number of STKM streams associated with this component.

A STKM_stream_id is an 8-bit unsigned integer field that shall identify an STKM stream where keys to decrypt this protected component can be obtained, by reference to the STKM_stream_id in the component descriptor for the STKM stream.

An NRT_component_data (component_type) is explained as follow. The NRT_component_data( ) element provides the encoding parameters and/or other parameters necessary for rendering this component. The structure of the NRT_component_data is determined by the value of component_type field.

The FDT of the FLUTE sessions which is used to deliver the items lists all the content items and gives their sizes, data types, and other information relevant to the acquisition of the items.

Therefore, the present invention obtains information for accessing a FLUTE session carrying a corresponding content using NST to receive a content selected from a service guide constructed using NCT. And, the present invention intends to map information on a content item of NCT to information on a file transferred via a corresponding FLUTE session. In this case, identification of a service including the selected content item can be done via the NRT_service_id of the aforesaid NST. Yet, as mentioned in the foregoing description of FIG. 3, in order to know one or more content items included in each NRT service and files belonging to the content items in further detail, mapping to a content identifier within FDT information on a FLUTE session is necessary rather than information on the FLUTE session carrying the corresponding content item(s).

The NRT service is transferred via FLUTE and access information in an NST is connected to FLUTE session information as follows. A Source_IP_address becomes a source IP address of a same server that transmits all channels of FLUTE session. NRT_service_destination_IP_Address is signaled if there exists a destination IP address at a session level of this FLUTE session.

A component can be mapped to a channel within a FLUTE session and can signal a separate destination IP address per channel (this is different from an IP address signaled by a session unit) through component_destination_IP_address. Moreover, a destination port number is signaled through component_destination_UDP_port_num. And, it is able to additionally designate the number of destination ports starting from component_destination_UDP_port_num through port_num_count.

By designating ports to plural number, it is able to construct a plurality of channels for one destination IP address. In this case, one component is able to designate a plurality of channels. Yet, it is recommended that a channel is identified via a destination IP address in general. In this case, one channel can be regarded as mapped to one component.

In order to signal an additional attribute of a component constructing a session, it is able to use component_attribute_byte. Additional parameters required for signaling a FLUTE session can be signaled through this field.

In order to signal the FLUTE session, parameters are necessary. Such parameters include necessary parameters and parameters which are selectively necessary in association with the FLUTE session. First, the necessary parameters include a "source IP address" parameter, a "number of channels in the session" parameter, a "destination IP address and port number for each channel in the session" parameter, a "Transport Session Identifier (TSI) of the session" parameter and a "start time and end time of the session" parameter, and the parameters which are selectively necessary in association with the FLUTE session include an "FEC object transmission information" parameter, a "some information that tells a receiver in the first place, that the session contains files that are of interest", and a "bandwidth specification" parameter.

The "number of channels in the session" parameter may be explicitly provided or may be obtained by summing the number of streams configuring the session. Among the parameters, the "start time and end time of the session" parameter may be signaled through the NST suggested by the present invention, and the "source IP address" parameter, the "destination IP address and port number for each channel in the session" parameter, the "Transport Session Identifier (TSI) of the session" parameter and the "number of channels in the session" parameter may be signaled through session_description_descriptor.

FIG. 14 is an exemplary diagram for a bit-stream syntax of an NCT section configured according to an embodiment of the present invention.

A single NRT service may contain multiple FLUTE sessions. Each session may be signaled using one or more FLUTE component descriptors, depending on the IP addresses and ports used for the sessions.

In the following description, each field of NRT_component_data descriptor is explained in detail.

A TSI is a 16-bit unsigned integer field, which shall be the Transport Session Identifier (TSI) of the FLUTE session.

A session_start_time indicates the time at which the FLUTE session starts. If the value of this field is set to all zero, then it shall be interpreted to mean that the session has already started.

A session_end_time indicates the time at which the FLUTE session ends. If the value of this field is set to all zero, then it shall be interpreted to mean that the session continues indefinitely.

A tias_bandwidth_indicator is a 1-bit field that flags the inclusion of Transport Independent Application Specific (TIAS) bandwidth information. This bit shall be set to '1' to indicate the TIAS bandwidth field is present, and it shall be set to '0' to indicate the TIAS bandwidth field is absent.

An as_bandwidth_indicator is a 1-bit field that flags the inclusion of Application Specific (AS) bandwidth information. This bit shall be set to '1' to indicate the AS bandwidth field is present, and it shall be set to '0' to indicate the AS bandwidth field is absent.

A FEC_OTI_indicator is a 1-bit indicator that indicates whether FEC Object Transmission Information is provided.

A tias_bandwidth field has a value. This value shall be one one-thousandth of the TIAS maximum bandwidth, rounded up to the next highest integer if necessary.

An as_bandwidth has a value. This value shall be the AS maximum bandwidth.

A FEC_encoding_id field identifies a FEC encoding ID used in this FLUTE session.

A FEC_instance_id field identifies a FEC instance ID used in this FLUTE session.

By signaling the above described parameters via FLUTE component data bytes, it is able to provide all information mandatory to receive a FLUTE session. And, it is able to use a method of receiving FDT via this session, obtaining information all files carried on a FLUTE session via the received FDT and receiving theses files.

This FLUTE component descriptor can be delivered via component_level_descriptor loop of NST. In case that there is a plurality of FLUTE channels, such parameters at a session level as TSI, session_start_time, session_end_time and the like should be signaled only once. Hence, one of components of several channels can transmit a FLUTE component descriptor via Component_level_descriptor loop.

In the following description, NCT is explained.

FIG. 15 is a diagram for a bit-stream syntax of an NCT section configured according to an embodiment of the present invention.

In the following description, explained is NCT associated with signaling/announcement of an NRT content transmitted per NRT content delivery channel signaled via the above described NST.

In FIG. 15, an NCT is newly defined to signal NRT content. This is just one of various embodiments and other methods are considerable as well. Via NCT, it is able to signal an NRT content carried on a specific NRT content delivery channel. Information of each field constructing an NCT section is explained in detail as follows. First of all, a table_id field (8 bits) identifies whether a corresponding table section is a table section constructing an NCT.

An NRT_service_id field describes a service_id of an NRT content delivery channel that delivers a content described in NCT.

A version_number field indicates a version number of NCT. Hence, a receiver is able to know whether an NCT content is changed, using the version_number.

A num_contents_in_section field indicates the number of contents described in NCT or the number of contents (or, files) carried on a virtual channel described as source_id.

A content_version field indicates a version number for content (or a file) having a specific content_id value. In particular, if a content_id, which was received and stored in advance by a receiver, is set to '0x0010', a same content, i.e., a file having a content_id value set to '0x0010' is transferred. If the content_version is different to that of the previously received and stored content, a content newly announced via NCT is received to update or replace the previously stored content. According to the present embodiment, the content_version field means a serial number indicating a version of release but may be able to represent a real published (released) time in direct. In this case, if it is difficult to represent a published time using the content_version field, it is able to use a new field capable of representing the published (released) time.

A content_id field indicates an ID value capable of identifying content (or, a file), which will be received and stored, uniquely.

A content_available_start_time field indicates a start time of a FLUTE session capable of receiving content. And, a content_available_end_time field indicates an end time of the FLUTE session capable of receiving the content.

A content_length_in_seconds field indicates a real playback time of a corresponding content by a unit of second if the content (or the file) is an A/V file.

A content_size field indicates a size of content (or, a file) by a byte unit.

A content_delivery_bit_rate field indicates a bit rate for transmitting content (or, a file) and means a target bit rate. In particular, this field indicates a bandwidth that will be allocated when a service provider or a broadcasting station transmits a corresponding content. Using this information, a receiver is aware of a minimum time consumed for receiving a corresponding file using the content_size and the content_delivery_bit_rate. Namely, it is able to provide a user with corresponding information by estimating a time taken to receive content. In this case, minimum time for receiving is obtained from calculating (content_size*8)/(content_delivery_bit_rate) by a unit of seconds.

A content_title length field indicates a length of content_title_text( ) by a byte unit. Using this, it is able to know how many bytes need to be read to enable a receiver to exactly obtain content_title_text( ) information.

A content_title_text( ) field is a content title in the format of a multiple string structure (MSS).

As a method of constructing the above described NST, one or more NRT channels can include one channel.

In this disclosure, an NRT channel is constructed by an NRT service unit. And, it is capable to have at least one FLUTE session for transferring a file via FLUTE.

In general, a FLUTE session can be uniquely identified/referenced using such a parameter as a TSI, an IP, a port address and the like and is temporally bound to a session_start_time and a session_end_time.

In constructing a table, using session_start_time and session_end_time, a FLUTE session during this time period is announced.

It is able to configure information on all NRT channels, which are currently transmitted or shall be transmitted in the future, with one table. This can be divided into a present time (a predetermined period from a present time) and a future time (after the period defined as the present time). Alternatively, the information can be sent by being divided into three sections including a predetermined time within a present time (e.g., 24 hours), a predetermined time after the former predetermined time (e.g., 24 hours) and a time after the latter predetermined time and then constructing tables for the three sections, respectively.

Moreover, using a table_id, it is able to discriminate whether it indicates guide information on a currently receivable content or guide information on a content receivable in the future. This relates to a method of separating an NRT service receivable within a short time range from a current time and services receivable after the time into different tables and then transmitting the tables.

In case of receiving the guide information on a content receivable in the future, a receiver performs temporal alignment using available_start_time and available_end_time information of each content and enables the guide information on the NRT service to be outputted to a user.

Yet, despite changing a table constructing method different from the above described example, each field constructing a table element shall be identical.

A Method for Providing an NRT Service

A receiver constructs NRT guide information using the above described NRT service signaling data and then displays the constructed NRT guide information to provide to a user. In this case, a method of constructing the NRT guide information may use a received NCT or NST for example. This will be explained in the following descriptions of embodiments.

Figure 16:
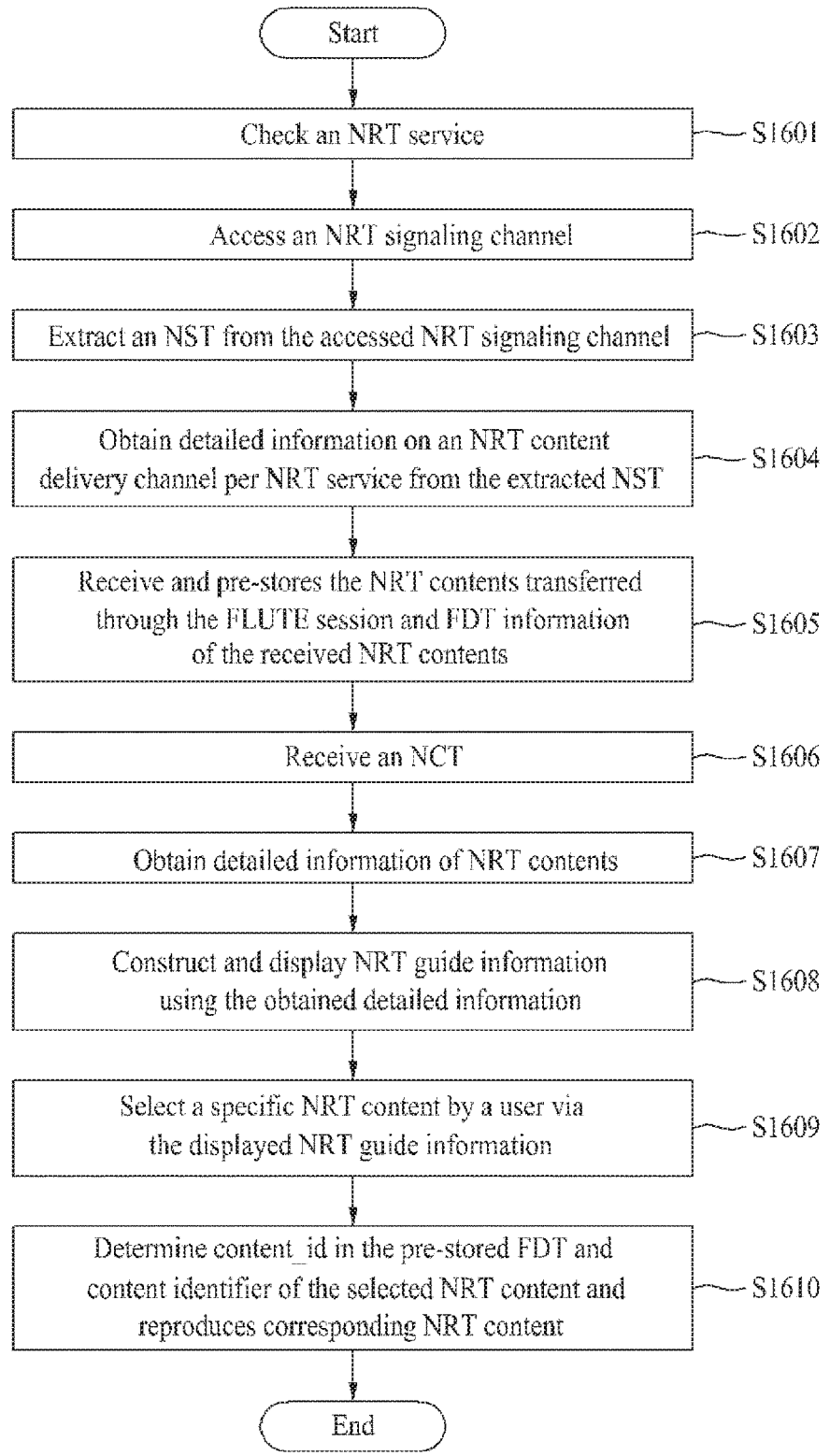
FIG. 16 is a flowchart for a method of configuring NRT guide information and providing contents according to another embodiment of the present invention.

FIG. 16 is a flowchart for a method of configuring NRT guide information and providing contents according to another embodiment of the present invention.

Referring to FIG. 16, a receiver checks an NRT service carried on a virtual channel [S1601] and then accesses an NRT signaling channel transmitted via an IP layer [S1602].

Subsequently, NST is extracted from the accessed NRT signaling channel [S1603].

Detailed information on an NRT content delivery channel per NRT service is obtained from the extracted NST [S1604].

The receiver parses the extracted NST, connects the NRT service, and receives and pre-stores the NRT contents transferred through the FLUTE session and FDT information of the received NRT contents [S1605]. Herein, during PID of TP including an NCT, the receiver is known the corresponding PID which is previously assigned or recognized well-known.

An NCT having NRT_service_id matching a service_id value per the NRT content delivery channel is extracted from the obtained detailed information NCT is received [S1606]. The receiver obtains detailed information of NRT contents using each field in the received NCT [S1607]. NRT guide information is constructed using the detailed information obtained in the step S1607, e.g., content_delivery_bit_rate, content_available_start_time, content_available_end_time, content_title_text( ) etc. and is then displayed [S1608].

If a signal indicating that a specific NRT content has been selected by a user via the displayed NRT guide information is received [S1609], the receiver determines content_id in the pre-stored FDT and content identifier of the selected NRT content. And the receiver reproduces corresponding NRT content [S1610].

An NRT Service Signaling Architecture

Figure 17:
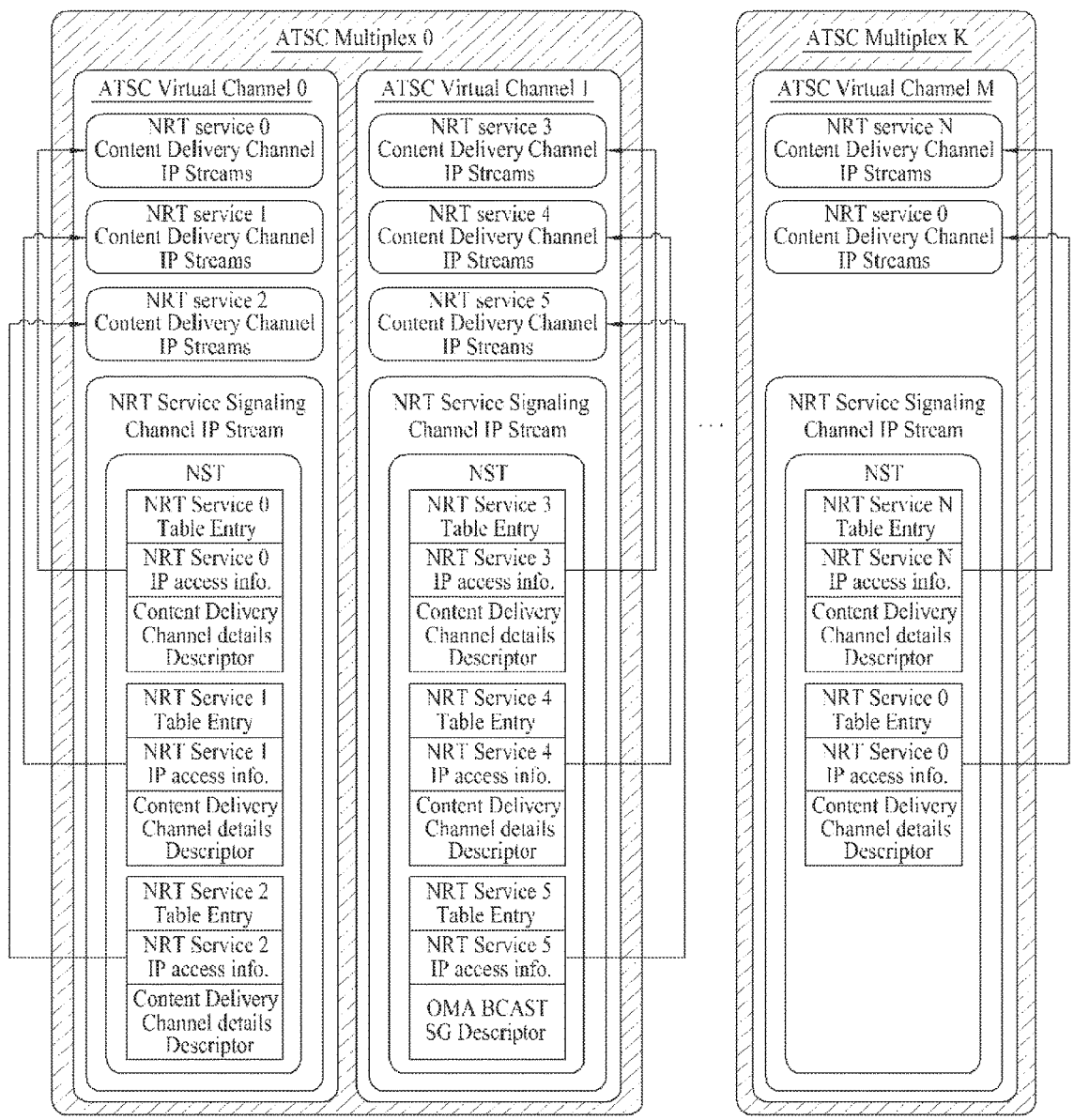
FIG. 17 is a diagram for an NRT service signaling structure configured according to another embodiment of the present invention.

A signaling structure of the above described NRT service is shown in FIG. 17.

FIG. 17 is a diagram for an NRT service signaling structure configured according to another embodiment of the present invention.

Referring to FIG. 17, each ATSC virtual channel includes at least one of content delivery channel to be transferred as IP stream including each NRT service and NRT service signaling channel to be transferred as IP stream transferring signaling information of each content delivery channel. At this time, the NST is transferred via the NRT service signaling channel. The NST includes a table entry and signals the content delivery channel transferring corresponding NRT service. For instance, three NRT channels are provided on ATSC Virtual Channel 0 and NRT channels 0, 1 and 2 are NRT content delivery channels. In case of ATSC Virtual Channel 1, three NRT channels are provided on NRT channel 5. And, NRT channels 3, 4 and 5 are NRT content delivery channels. In particular, one virtual channel includes one or more NRT channels and the NRT channel can be an NRT content delivery channel. And, an NST is able to identify each of the NRT channels or each of the NRT content delivery channels. Each of the NRT channels carries an IP stream. On this NRT service signaling, a signaling flow according to a method of accessing an NRT content delivery channel is available.

NRT Content Delivery Channel

As a method of accessing an NRT content delivery channel for carrying NRT content, the following method is available.

A method of directly signaling NRT content delivery channel information via an NST table is for directly delivering basic information on an NRT channel and access information via an NST. If an NST side performs this NRT channel metadata transmission, the following advantages exist.

First of all, in this case, by directly signaling in NST without an additional process for receiving and processing separate service guide information, it is able to receive channel metadata in the early timing point. Therefore, it is able to raise a service access speed. Moreover, it is able to perform update signaling for a changed item of a channel in a broadcasting environment more quickly and by real time.

Thus, if NRT service information carrying an NRT content delivery channel on an NST is directly signaled, a content delivery channel access is possible with an NST only without a separate signaling process.

An NRT content delivery channel for carrying real NRT content can have an NRT channel type value set to '0x0F'.
NRT Content Delivery Channel Details Descriptor In order to perform signaling on an NRT content delivery channel via an NST in the course of the above process, the following method is available. It is able to identify an NRT service carrying an NRT content delivery channel if a service category value is set to '0x0F'. Additional information of an NRT content delivery channel can be delivered being transmitted in a manner that an NRT content delivery channel details descriptor exemplarily shown in FIG. 17 is inserted in a descriptor loop of NST.

FIG. 18 is a diagram for a bit-stream syntax of an NRT Content delivery channel details descriptor configured according to an embodiment of the present invention.

Fields of an NRT Content delivery channel details descriptor are explained in detail as follows.

A descriptor tag is 8-bit unsigned integer shall have the value '0xTBD', identifying this descriptor as NRT_content_delivery_channel_details_descriptor.

A descriptor_length is 8-bit unsigned integer shall specify the length (in bytes) immediately following this field up to the end of this descriptor.

A storage_reservation is 32-bit unsigned integer shall specify minimum device storage (in bytes) required for subscription to this channel.

An Updated is 32-bit unsigned integer, which shall represent time when the channel metadata was last updated as the number of GPS seconds since 00:00:00 UTC, Jan. 6, 1980.

A content_types_length field shall specify the length (in bytes) of the content_types_text ( ).

A content_types_text( ) field shall give a comma-separated list of strings that describe the type of channel content e.g. by "category", "tag" or "relation".

A mime_types_length field shall specify the length (in bytes) of the mime_types_text( ).

A mime_types_text( ) field shall give a comma-separated list of MIME types for content items in the offered channel.

A charging_rules_length field shall specify the length (in bytes) of the charging_rules_text( ).

A charging_rules_text( ) field shall give Information that at least defines who is responsible for the channel charging, charging method (based upon a subscription or a consumption).

A num_purchase_options field (8-bit) shall specify the number of purchase options in this NRT Content delivery channel descriptor.

A purchase_option_id_length field shall specify the length (in bytes) of the purchase_option_id_text ( ).

A purchase_option_id_text( ) field shall give an identifier of the purchase option, that will be used to identify the selected option.

A cost_information_flag is a 1-bit Boolean flag that shall indicate, when set to '1', that the cost_information is present for this component.

A price_information_flag is a 1-bit Boolean flag that shall indicate, when set to '1', that the amount and currency is present for this component.

A cost_information_length field shall specify the length (in bytes) of the cost_information_text( ).

A cost_information_text ( ) field shall give an identifier of the purchase option, that will be used to identify the selected option.

An amount is a 32-bit float, which shall specify the monetary value of the price for this purchase option.

A currency is a 16-bit unsigned integer, which shall specify the monetary currency codes.

The above described descriptor is included in a position of service_level_descriptor within NST or can be included in a position of content_level_descriptor within NCT.
A FDT Schema FIG. 19 is an exemplary diagram to explain a FDT schema for mapping a file to content_id according to an embodiment of the present invention, and FIG. 20 is an exemplary diagram to explain a FDT schema for mapping a file to content_id according to another embodiment of the present invention, which represents a FDT instant level entry file designating method.

In the following description, a FDT instance level refers to a level containing a portion, in which the common attribute is defined, if the common attribute of all files declared in the FDT needs to be defined. The FDT file level is used to indicate a level containing definition of the individual attribute of each of the files.

The receiver identifies whether transferred service via corresponding channel is an NRT service based upon the NST and NCT. Also, the receiver identifies content items and files of corresponding NRT service.

As mentioned in the foregoing description, the receiver may identify files and content items in the fixed NRT service. However, the receiver can not be matched the files to the content items because of not having information on mapping the files to the content items. Accordingly, the receiver can not process the received fixed NRT service.

Therefore, the present invention can provide a method for mapping the files to the content items. In this case, the receiver can properly process the received fixed NRT services. In this disclosure, the method may be specified based on the FDT information in the FLUTE session transmitting fixed NRT services. For instance, each file constructing the content items is identified based on content-location and TOI field specified in the FLUTE session. Moreover, the TOI field or content-location field and content item is corresponded to be matched a content identifier in the FDT with the content_id field in the NCT.

Referring to FIGS. 19 and 20, a part indicated by #1 declares content_id at FDT-Instance level. In this case, the declared content_id is given to all files declared within the corresponding FDT-Instance. Of course, by newly giving content_id at a file level, it is able to overdrive this information. Alternatively, if a specific file belongs to another content item instead of a content item defined at the FDT-Instance level, this can be announced by giving a file level content_id that will be explained in the following description. In the present embodiment, content_id is represented using 16 bits.

A part indicated by #2 declares content_id at a file level. If a file included within FDT Instance belongs to a different content item, it is signaled that each file belongs to a prescribed content item using this method.

A part indicated by #3 is a method for informing each file whether the corresponding file is an entry file. In particular, a file, which is played back in the first place, or a file corresponding to a root file, which should be executed first to access a content item, among several files constructing a content item is called an entry file. This part indicates a method of announcing this information. It is able to omit 'entry' attribute. If it is omitted as 'false', a basic value means that a corresponding file is not an entry file.

By signaling a presence or non-presence of an entry according to a group belonging at a file level, a specific file plays a role as an entry in a specific group but may fail to play the role in another group.

Regarding an embodiment of an entry file, if a content item is constructed as a web page, assume that index.htm and other several associated pictures and text files exist, the index.htm becomes the entry file.

As a method of announcing a presence or non-presence of an entry file in case of granting content identifier at FDT-instance level, the following two kinds of methods can be taken into consideration.

1) Method of granting File-level content identifier to a file corresponding to an entry file in addition and setting its entry attribute to 'true': In this case, it is disadvantageous in that content identifier is overlapped at FDT-Instance level and file level. Yet, this case can provide a most flexible structure.

2) It is able to consider a method of directly referencing files playing a role as an entry file in the content identifier definition at FDT-instance level like another embodiment of the FDT scheme shown in FIG. 20. For this, in the embodiment shown in FIG. 20, FDT-Content-ID-Type is separately defined for FDT-instance level content identifier. This is extended to include a content location of an entry file as indicated by #2.

In case of this method, it may be disadvantageous in that a content location is repeatedly signaled. But, it becomes advantageous in that entry file configuring information can be directly obtained per content item.

An Embodiment of Overall Operations of Receiver

Figure 21:
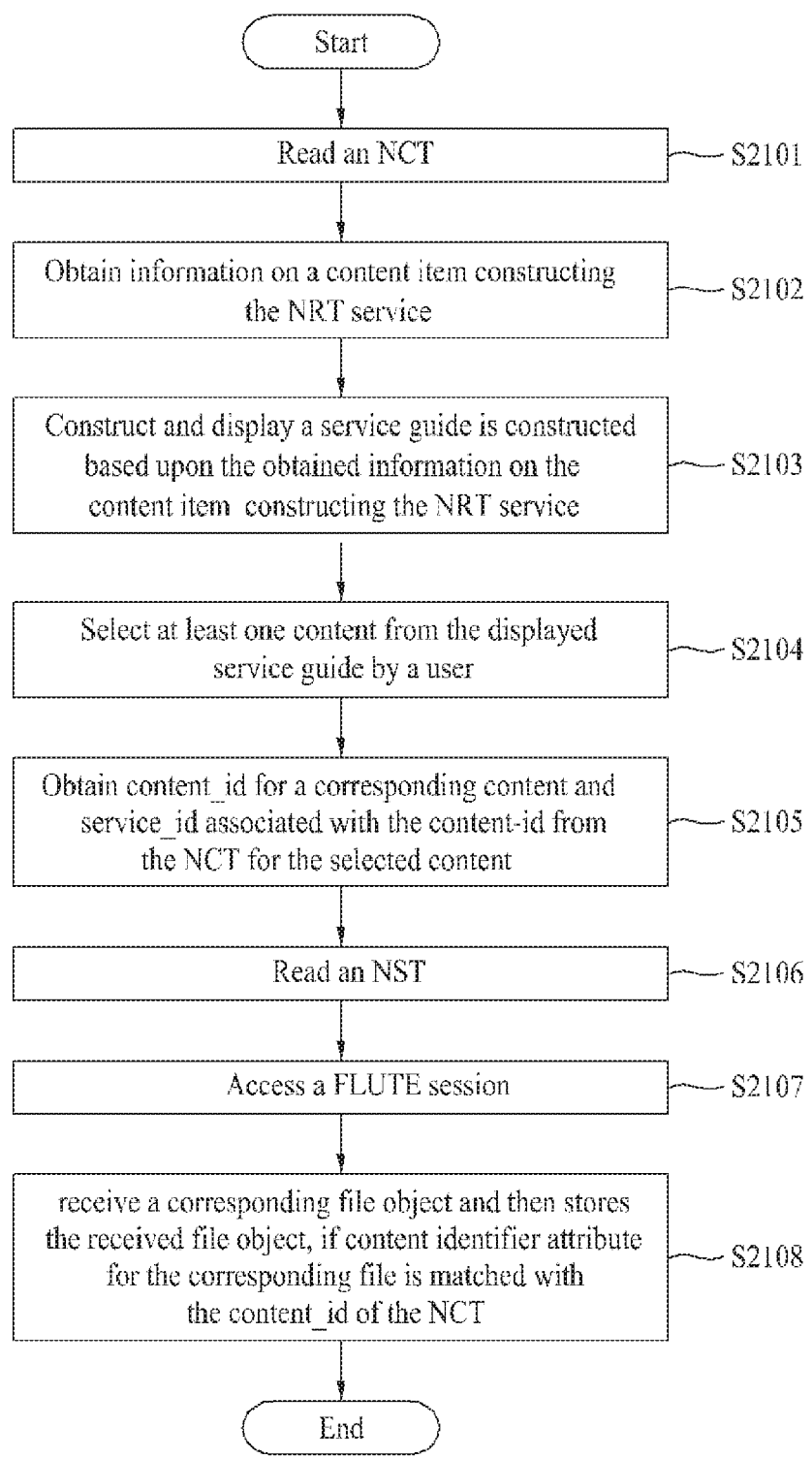
FIG. 21 is a flowchart to explain a process for processing an NRT service in a receiver according to an embodiment of the present invention.

FIG. 21 is a flowchart to explain a process for processing an NRT service in a receiver according to an embodiment of the present invention.

Referring to FIG. 21, a receiver reads an NCT for signaling an NRT service [S2101]. The receiver obtains information on a content item constructing the NRT service via the read NCT [S2102]. In this case, the information on a content item, for example, may be displayed an NRT guide information which is constructed based on the content_id, the content_delivery_bit_rate, the content_available_start_time, the content_available_end_time, the content_title_text( ) and so on.

A service guide is constructed based upon the obtained information on the content item constructing the NRT service and is then displayed [S2103].

If at least one content is selected from the displayed service guide by a user or the like [S2104], content_id for a corresponding content and service_id associated with the content-id are obtained from the NCT for the selected content [S2105].

The receiver reads an NST in the information for signaling the NRT service to receive the selected content [S2106] and then accesses a FLUTE session for carrying a file constructing the corresponding content item by finding service_id that matches the service_id obtained in the step S2104 [S2107].

The receiver reads a FDT in the corresponding FLUTE session and then determined whether or not content identifier of the corresponding field is identical to the content_id in the acquired NCT.

If content identifier attribute for the corresponding file is matched with the content_id of the NCT, the receiver receives a corresponding file object and then stores the received file object [S2108].

In this case, the receiver can be aware of a file list belonging to each content-item by parsing FDT instances within a session. The receiver is also able to recognize which file in the file list plays a role as an entry. In particular, the receiver is able to know that each file belongs to a prescribed content item using the FDT instance. The receiver is able to arrange a file list by a content item unit separately and then stores the arranged list, if necessary.

When a specific content item starts to be used by a selection made by a user or the like, content consumption is initiated using the content item configuration information obtained in the above process and the entry information included in the content item configuration information.

In this case, in constructing a service guide using the NCT, it is able to construct a service guide using both NCT and NST by parsing them together instead of parsing NCT and NST in order. For instance, after descriptors for NST and associated NRT service have been parsed, application type and other requirement information are read by each NRT service unit. Moreover, application (service category) information on each service is displayed on an NRT service guide output screen and detailed information is displayed using other fields of NRT_service_info_descriptor (displaying a size of a corresponding service using storage requirement field, displaying audio and video codec information using audio_codec_type field and video_codec_type field, etc.)

For instance, referring to FIG. 16, the NRT service may be provided by a PUSH method or through an NRT service dedicated channel according to an embodiment of the present invention. At this time, the receiver receives the content items within the received NRT service through the accessed FLUTE session and then stores. And, the receiver reproduces wanted content item within the stored content items based on the NCT. Herein, the wanted content item is selected by a user.

However, referring to FIG. 21, the receiver parses an NCT and then provides a service guide to a user based on the parsed NCT. And, if the user selects a specific content item, the receiver parses an NST. Then the receiver accesses an FLUTE session transmitting the NRT service including the selected content item. The receiver receives the NRT service including the selected content item and then stores the content item. Finally, the receiver can reproduce the stored content item.

In the above-mentioned, the method of FIG. 16 differs from the method of FIG. 21. The method of FIG. 16 can quickly reproduce the content item by pre-storing all content items in the NRT service. Also, the receiver can only store the wanted content item according to the method of FIG. 21. Herein, the receiver can provide a service guide and then only receive the content item selected by the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting a non-real time (NRT) service, the method comprising:
   generating data for the NRT service that is delivered in advance of its use;
   generating signaling data for signaling services including the NRT service; and transmitting a broadcast signal including the generated data and the generated signaling data, wherein the generated signaling data includes signaling information and NRT signaling information, wherein the NRT signaling information is related to delivery of the generated data, wherein the NRT signaling information is carried based on a User Datagram Protocol/Internet Protocol (UDP/IP) method, wherein the generated data is delivered through a file delivery session based on Layered Coding Transport (LCT) protocol upon a UDP/IP protocol in the broadcast signal, wherein the NRT signaling information includes a transmission session identifier, a start time, an end time and bandwidth information for the transmission session, wherein the bandwidth information is specified by using an Application Specific bandwidth and represents a maximum bit-rate required by the transmission session, and wherein the signaling information includes service category information identifying the NRT service, hidden information indicating that the NRT service is not intended to be selected and signaling channel information for carrying the NRT signaling information.

2. The method of claim 1, wherein:

the generated data includes one or more content items; and the NRT signaling information includes identification information of the one or more content items.

* * * * *